US011875280B2

(12) United States Patent
Besecker et al.

(10) Patent No.: US 11,875,280 B2
(45) Date of Patent: Jan. 16, 2024

(54) RENDERING 3D MODEL DATA FOR PRIORITIZED PLACEMENT OF 3D MODELS IN A 3D VIRTUAL ENVIRONMENT

(71) Applicant: Marxent Labs LLC, Miamisburg, OH (US)

(72) Inventors: Barry Besecker, Xenia, OH (US); Anna Wittekind, Grand Rapids, MI (US); Ryan Roche, Troy, OH (US); Matthew Robert Mooney, Dayton, OH (US); Ian Newland, Beavercreek, OH (US); Jonathan Jekeli, Centerville, OH (US); Jayson Alan Hilborn, Beavercreek, OH (US)

(73) Assignee: Marxent Labs LLC, Miamisburg, OH (US)

( * ) Notice: Subject to any disclaimer, the term of this patent is extended or adjusted under 35 U.S.C. 154(b) by 0 days.

(21) Appl. No.: 18/063,365

(22) Filed: Dec. 8, 2022

(65) Prior Publication Data
US 2023/0177594 A1 Jun. 8, 2023

Related U.S. Application Data

(60) Provisional application No. 63/287,306, filed on Dec. 8, 2021.

(51) Int. Cl.
*G06Q 30/0601* (2023.01)
*G06T 19/20* (2011.01)

(52) U.S. Cl.
CPC ......... *G06Q 30/0643* (2013.01); *G06T 19/20* (2013.01)

(58) Field of Classification Search
CPC ........................... G06Q 30/0643; G06T 19/20
See application file for complete search history.

(56) References Cited

U.S. PATENT DOCUMENTS 10,572,988 B1 2/2020 Chaturvedi
10,600,255 B2 3/2020 Besecker
(Continued)

OTHER PUBLICATIONS

Y. He, Y.-T. Liu, Y.-H. Jin, S.-H. Zhang, Y.-K. Lai and S.-M. Hu, "Context-Consistent Generation of Indoor Virtual Environments Based on Geometry Constraints," in IEEE Transactions on Visualization and Computer Graphics, vol. 28, No. 12, pp. 3986-3999, Dec. 1, 2022, doi: 10.1109/TVCG.2021.3111729. (Year: 2021).*

(Continued)

*Primary Examiner* — Michelle T Kringen
(74) *Attorney, Agent, or Firm* — Sheppard Mullin Richter & Hampton LLP

(57) ABSTRACT

Systems and methods for designing a virtual environment are provided. Various data are used, including images that depict different room layouts and styles, physical measurements and limitations of objects depicted in the images (e.g., dimension information, attributes purchase information, etc.), and object placement rules to assist with object placement in a virtual environment. The data may be displayed on a graphical user interface (GUI), and in response to selection of an object and/or room layout, the GUI may be populated with a virtual environment displayed in a design window of the GUI with objects placed in the virtual environment. The objects may be visually organized based on object placement rules and/or inspirational design elements.

15 Claims, 22 Drawing Sheets

(56) References Cited

U.S. PATENT DOCUMENTS

| | | | |
|---|---|---|---|
| 10,614,625 B1* | 4/2020 | Goetzinger, Jr. | G06T 19/20 |
| 10,672,191 B1 | 6/2020 | Besecker | |
| 11,049,317 B2* | 6/2021 | Besecker | G06T 19/20 |
| 11,144,680 B2* | 10/2021 | Jovanovic | G06T 19/20 |
| 2002/0010655 A1* | 1/2002 | Kjallstrom | G06Q 30/0625 |
| | | | 705/26.62 |
| 2005/0081161 A1 | 4/2005 | MacInnes | |
| 2008/0122840 A1 | 5/2008 | Falco | |
| 2013/0127893 A1 | 5/2013 | Gokturk | |
| 2015/0243071 A1 | 8/2015 | Jovanovic | |
| 2016/0026724 A1 | 1/2016 | Ramsey | |
| 2019/0325643 A1 | 10/2019 | Besecker | |
| 2021/0049829 A1* | 2/2021 | Yang | G06T 17/10 |
| 2021/0279957 A1* | 9/2021 | Eder | G06Q 10/06395 |
| 2022/0114291 A1* | 4/2022 | Li | G06F 3/0484 |

OTHER PUBLICATIONS

R. J. Cant and C. S. Langensiepen, "Methods for Automated Object Placement in Virtual Scenes," 2009 11th International Conference on Computer Modelling and Simulation, Cambridge, UK, 2009, pp. 431-436, doi: 10.1109/UKSIM.2009.69., (Year: 2009).*

Liu, Zicheng, et al. "Model-driven indoor scenes modeling from a single image." Proceedings of the 41st Graphics Interface Conference. 2015 (Year: 2015).*

International Patent Application No. PCT/US2018/028574, Notification of Transmittal of the International Search Report and the Written Opinion of the International Searching Authority, or the Declaration, dated Jul. 24, 2019, 12 pages.

International Patent Application No. PCT/US2019/028574, Notification Concerning Transmittal of Copy of International Preliminary Report on Patentability (Chapter I of the Patent Cooperation Treaty) and International Preliminary Report on Patentability, dated Oct. 29, 2020, 9 pages.

Liu, Zicheng, et al., "Model-Driven Indoor Scenes Modeling from a Single Image," Graphics Interface Conference, Jun. 3, 2015, 8 pages.

Satkin, Scott, et al., "Data-Driven Scene Understanding from 3D Models," https://www.robots.ox.ac.uk/~vgg/rg/pa/pers/bmvc2012_satkin_data_driven.pdf, dated Jan. 2012, retrieved Dec. 16, 2015, 11 pages.

Sweet Home, "Sweet Home 3D User's Guide;", online at <URL: https://web.archive.org/web/20180208100505/http://www.sweethome3d.com:80/userGuide.jsp>, Feb. 8, 2018 (Year: 2018), pp. 1-15.

Xu, Kun, et al., "Sketch2Scene: Sketch-Based Co-Retrieval and Co-Placement of 3D Models," ACM Transactions on Graphics, vol. 32, No. 4, Jul. 1, 2013, 12 pages.

* cited by examiner

```
Ts magic-room-data.ts > ...
1   import { MagicRoomCabinetRun } from "./magic-room-cabinet-run";
2   import { MagicRoomZone } from "./magic-room-zone";
3
4   export interface MagicRoomData {
5       zones: MagicRoomZone[ ]; // Zones that can be created and placed inside of a magic room
6       cabinetRuns: MagicRoomCabinetRun[ ]; // Runs that can be placed to fill space between zones
7   }
```

FIG. 12

RENDERING 3D MODEL DATA FOR PRIORITIZED PLACEMENT OF 3D MODELS IN A 3D VIRTUAL ENVIRONMENT

CROSS REFERENCE TO RELATED APPLICATIONS

This application is a non-provisional patent application which claims the benefit of U.S. Patent Application No. 63/287,306, filed Dec. 8, 2021, the entire contents of which are incorporated herein by reference in its entirety.

This application is co-pending with U.S. patent application Ser. No. 17/360,516, filed Jun. 28, 2021 (which issued as U.S. Pat. No. 11,544,901 on Jan. 3, 2023), the entire contents of which are incorporated herein by reference in its entirety.

This application is related to U.S. Pat. No. 10,672,191, issued Jun. 6, 2020, U.S. Pat. No. 10,600,255, issued Mar. 24, 2020, and U.S. Pat. No. 11,049,317, issued Jun. 29, 2021, the entire contents of each application are incorporated herein by reference in its entirety.

Aspects of the invention described below use concepts described in the above-referenced patents and applications to implement features described herein. Additionally, the concepts described in the above-referenced patents and applications may be used in various combinations with the concepts described herein.

TECHNICAL FIELD

The disclosed technology relates to computer-implemented system including a three-dimensional (3D) room designer application that computer-generates an algorithmically determined arrangement of 3D models of objects in a virtual environment, based on using image analysis (or other technology) to identify objects in a user-selected two-dimensional (2D) image depicting a layout of objects (e.g., furniture or other objects), where the arrangement determination corresponds at least in part to stored physical attributes of the corresponding objects and specified parameters of the virtual environment where the algorithm can adapt the depicted layout of objects from the image based on the parameters of the virtual environment to facilitate automated arrangement, even when the size, shape and/or other parameters of the room in the 2D image differ from the size, shape and/or other parameters of the virtual environment.

BACKGROUND

Various room design tools exist. These design tools suffer from various well known drawbacks and limitations. Efforts to simplify the process of using these tools, in part, by basing a room design on a 2D photograph have been proposed, but this too has several technical limitations. For example, often the exact configuration of the objects in the photo will not work in the room being designed. For example, the size, shape and/or other parameters of the room in the 2D photograph may differ from the size, shape and/or other parameters of the virtual environment. Additionally, in some cases, users need to manually select individual objects within a room and select a location at which the object should be placed in the virtual environment. This can be tedious, time consuming and frustrating for users. These and other technical limitations adversely impact tools that propose basing room design on a layout in a photograph. As used herein a photograph can include a digital image.

BRIEF SUMMARY OF EMBODIMENTS

Systems, methods, and computer-readable media are disclosed for facilitating room design, including computer generating an algorithmically determined arrangement of 3D models in a virtual environment, based on a 2D image depicting a layout of objects (e.g., furniture or other objects in a 2D image), where the determination is based at least in part on physical attributes of the corresponding objects, the size, shape and/or other parameters of the room in the 2D image and the size, shape and/or other parameters of the virtual environment. In some embodiments, upon user selection of a 2D image, the system will create (if not already created) 3D models of objects in the selected image and automatically render the 3D models in a virtual environment at locations determined by placement and/or rendering rules, all without requiring the user to select individual objects in the image and/or locations for the objects as is typical with prior systems.

The system includes a remote computing device with a master resource database (e.g., for storing 3D model data) and master layout database (e.g., for storing images and/or image information for images depicting layouts of objects), and a local computing device with a resource manager, local resource database, rendering engine, and 3D room designer application. The remote computing device and/or the local computing device may include one or more storage devices for storing 2D images and image metadata, 3D model data and product or other object information.

The stored 2D images may include a visual representations of rooms depicted in an image, including objects in the room, layouts of the objects and/or other information. The layout may include the location of the objects within the room and the relative location of the objects with respect to one another. Image metadata information stored in association with the 2D image may include information about objects in the image, layout information of the objects in the image, attribute information about the image, including for example, a category type of the room or other space depicted in the room (e.g., dining room, living room of other room category), décor style information (e.g., modern, contemporary, transitional, or other décor style information) and/or other image information.

The object information may include information about objects (e.g., objects in the stored 2D images or other objects). At least some of the objects may include products available for purchase (e.g., from one or more manufacturer, retailer and/or other source). Stored product information may include a product identifier to relate the object to a known purchasable object (e.g., by a stock keeping unit or "SKU" or other product identifier). The product identifier may associate an object in an image with a product in a product information database. Product information in the database may include a product identifier (e.g., SKU), available style or finish information from a particular manufacturer (e.g., cover SKU for customizable sofa), dimension information, product attributes, product and/or other physical attributes of the product and purchase information (e.g., where it is available for purchase), and/or other product information.

For example, 2D images may depict different room layouts and styles, physical measurements and attributes of objects depicted in the images (e.g., dimension information, color, texture and/or other physical attributes of the corresponding objects), purchase information, and/or other attributes.

Object and/or product information may include rendering rules to assist with rendering of objects in the virtual environment. The rendering rules may include rules for an object or a set of objects. For example, for a table lamp, the information may specify that the lamp must be placed on a table or other surface, but not a floor. Many other rendering rules can be used. This data may be stored with the 2D images in the data store and/or as product information.

3D model data may comprise various information about a 3D model that is stored in a database. For example, the stored 3D model data may include various wire frames and skin or physical attributes, including for example color, texture, material, default dimensions of the object, lighting, depth, and/or other physical attributes. A wire frame models and skins in general are known. In some embodiments the 3D model data is rendered at run-time based on an object to be rendered and its attributes. This avoids needing to store a model for each product and each product configuration.

The 3D model data may include information relating to the 3D model's relationships to other 3D models including depth layer, horizontal order, vertical order, rotation offset, height offset, focal group, facing direction, and/or other model information and/or rendering rules. In some examples, the 3D model data may store relative position information regarding the placement of the 3D model in relation to other 3D models.

In some examples, product information may be provided by an administrative user and/or may be imported from an entity's product catalog database. The metadata may identify the SKU, dimensions, preferred placement (e.g., floor, wall, on top of another 3D model like a table, etc.), or other information for the product. In some examples, the metadata may correspond with product descriptions in an entity's product catalog. The metadata may be used to generate or implement one or more placement rules or rendering rules associated with the rendered 3D model in the virtual environment. As described below, the product information may including a mapping of the product to 3D model data, including one or more wireframes and skins or other attributes.

The system may include one or more storage devices for storing 3D model data for objects (e.g., furniture or other objects). One or more storage devices may store object information for identifying an object (e.g., a product identifier) in a 2D image and metadata about the images and/or objects including, for example, physical attributes of the room in the 2D image (e.g., traditional-style or contemporary-style kitchen, a blue room, or other physical room attributes) and physical attributes of the objects (e.g., dimensions, color, texture, composing material, and/or function of the products, among other physical attributes). One or more storage devices may store the image information.

The system may include a set of user interfaces that enable the user to view, search for and select from the 2D images. The images may be organized and/or user searchable based on the attributes of objects and/or images.

A preprocessing module may process 2D images that are stored or to be stored in the system. The preprocessing module may process the 2D images to create and store the image information, identify objects, physical attributes of the objects and a layout of the objects in the selected image, map identified objects to stored 3D model data, and store the mapping in one or more storage devices. This preprocessing of images (e.g., before they are made available for user selection) enables the system to automatically generate 3D models of the objects of the images upon selection of an image. Additionally, this generates information that may be used by the placement rules and rendering rules.

The system may include a computer-implemented 3D room designer application configured to create a virtual environment with specified parameters. Various techniques can be used to create the specified parameters for the virtual environment. Based on a selected 2D image, the application may determine objects (e.g., products) depicted in the image and each object's mapping to 3D model data stored in the database, apply placement rules to determine the locations in the virtual environment at which 3D models of the objects should be placed, retrieve the 3D model data mapped to the object, generate a 3D model for each of the objects, and render the 3D models at the locations determined by the placement rules in the virtual environment.

The execution of computer-readable instructions to initiate placement of 3D models according to the placement rules comprises algorithmically determining the arrangement of the 3D models in the virtual environment as further described herein. The determination corresponds at least in part to stored physical attributes of the corresponding objects and specified parameters of the virtual environment.

A set of user interfaces may enable the user to specify parameters of the virtual environment, including for example, one or more of the size of the space, a space configuration (e.g., orientation and size of one or more walls, a ceiling and/or other space configuration parameters), structural features (e.g., size and location of windows, doors, sinks, appliances and/or other structural features) and/or other specified parameters. Additional user interface elements of the 3D room designer application enable the user to manipulate the 3D models displayed in the virtual environment once they are placed, including adding or deleting 3D models from the virtual environment, moving the location of 3D models within the virtual environment and/or relative to other 3D models, and changing the attributes of the objects corresponding to the 3D models (e.g., color, texture, size or other attributes). The 3D room designer application can generate a new rendering based on these and/or other selections by a user.

The user interfaces may provide a visual space to help define the virtual environment, view the 2D image(s), view objects and/or 3D models of rendered objects that are or can be placed in the virtual environment, or other features for building the virtual environment. For example, the virtual environment may comprise a space that is user-defined based on specified parameters of the virtual environment, including for example, one or more walls with at least one delimiter (e.g., walls, doors, window below counter height, open border, virtual limit, or other parameters). The system may identify connecting walls and combine the walls to form the largest usable space that is internal to the walls and define the borders of the virtual environment to place 3D models of rendered objects in the virtual environment. The system may identify which objects are available and maximize the number of 3D models that could fit in the available space.

One portion of the interface may display the virtual environment and another portion of the interface may display the original 2D image(s). Alternatively, or in addition, the virtual environment may be displayed in one portion of the interface and another portion of the interface can simultaneously display objects or 3D models that can be placed in the virtual environment. This may include objects included in a selected image and/or other objects. When 3D models of objects are shown in the virtual environment, options for altering the objects may also be displayed. Optionally, the stored object information may include information regarding the attributes of an object that are alterable by a user, for example, based on a range of options stored in connection with the object (e.g., during the preprocessing process). The user may select different attributes to be altered including attributes such as textures, colors, shapes or other attributes of the corresponding objects, as further described herein.

One advantage of storing the 3D model data as described, instead of storing actual 3D models, is that the system can render as and when needed, a customized 3D model of the object with the user-selected physical attributes. Additionally, one or more user interfaces can provide tools for a user to move 3D models, individually or in groups as explained herein and place and/or move each object or group of objects in the virtual environment. In some examples, a user can edit one or more attributes of the 3D model or object. This is facilitated by the preprocessing of the images, identification of the object in the image and mapping of the object to 3D model data.

Rendering engine may receive 3D model data for objects in a selected 2D image and render 3D models at the determined locations in the virtual environment based on the placement rules and/or rendering rules. For example, the 3D model data may correspond with a stored wireframe object of a piece of furniture or other object and the rendering engine may add a skin and other physical attributes as an overlay of the wireframe object at run-time. The 3D model may represent a mathematical representation of points and surfaces (e.g., vertices and polygons), generated from 3D model data, in the virtual environment by the rendering engine. Such rendering can be performed in real-time (e.g., real-time rendering) or ahead of time (e.g., pre-rendering).

In some embodiments, a user may interact with the system, by viewing, via one or more graphical user interfaces, 2D images depicting a layout of objects (e.g., inspiration photos or other images). In some examples, the 2D image corresponds with a photograph that the user can select. The objects in the photograph or other 2D image can be selected automatically by selecting a desired photo and (if not already done), using a set of user interfaces to create a virtual environment by selecting parameters of the virtual environment. The system may be operable, in response to user selection of the 2D image, to determine objects in the 2D image and a determined placement (or an arrangement, used interchangeably) of the objects, and render, based on stored 3D model data corresponding with each of the objects in the 2D image, a set of 3D models of objects from the selected 2D image and computer generate an algorithmically determined arrangement of the 3D models in a virtual environment, where the determination corresponds at least in part to stored physical attributes of the corresponding objects and specified parameters of the virtual environment.

The rendering engine may implement an algorithm to determine the placement of the rendered 3D models in the virtual environment. For example, the process may find usable spaces in the virtual environment, including identifying mounting points for placing the 3D models. In some cases the mounting points may include anchor points (e.g., walls, windows, doors, or other stationary objects in the room) that have been incorporated with the virtual environment. Measurements of the remaining spaces in the virtual environment may be determined as usable spaces to place 3D models. The process may identify 3D models that can fit in the usable spaces. For example, a subset of 3D models stored in a computer memory may be determined as objects that can fit in the usable space. This can be illustrated as a ten-foot wide cabinet being unavailable to fit on a four-foot wide wall of the virtual environment and/or four-feet of remaining usable space. The process may consider placement rules of the 3D models (e.g., based on the original design intent of the room) and adjust the layout for different size and shape rooms. In another example, the 3D models may be placed starting with an mounting point (which may include an anchor point) and added around the mounting point. The process may consider limitations of the virtual environment, including corners, doorways, windows, or other limitations of the virtual environment, and remove 3D models from non-usable space located around the virtual environment. The process may then fill in the gaps in the virtual environment between the placed 3D models. For example, if the cabinets do not fill a full wall of the virtual environment, a spacer that corresponds with the additional space or gap in the virtual environment may be identified and used to fill in the gap without adding additional storage space in the virtual environment.

During the object placement process, the system may simultaneously display the virtual environment on one portion of a interface of the user device, and user options, available 3D models or corresponding objects to place in the environment, or other features discussed herein on another portion of the interface of the user device. These UI display options may enable a user to move, add, delete and/or edit objects that were automatically placed in the virtual environment. This functional ability to simultaneously display multiple portions of the system may enable the user to change the particular 3D models that are initially placed in the environment, or change the placement of those particular 3D models. This can help create an iterative process of manual object selection, placement, and movement, or maintain the automatic object selection and placement of the 3D models that is provided by the system.

When a user is satisfied with a design in the virtual environment, the user can elect to purchase the products corresponding with the 3D models in the virtual environment (e.g., stored as product data in the 3D model data for each of the objects) and order the products that may have been originally pictured in the 2D image to place in their physical space outside of the virtual environment. For example, the 3D models may represent a retail product that can be purchased by a user. Based on the product information data structure, purchase information may be stored with the product as described herein. For example, the stored product information may include one more links to where the product is available (e.g., a product page in an e-commerce system). By accessing the link or other purchase information the user can initiate an order for the product right from the user interface for the virtual environment or otherwise. The system may implement "add to cart" functionality from a user interface (e.g., one or more of the user interfaces described herein that are used to select or display images or objects and/or display the virtual environment) to enable or facilitate the purchase of the desired product(s).

In a 3D room designer application for a kitchen virtual environment, an anchor could be a sink, oven, hood, or a refrigerator and the 3D models can be placed around or relative to the mounting point. A coffee table or large couch might also be anchor points for a layout of furniture. This solution allows for many 3D models from a single layout to be at least initially placed into a complex 3D arrangement with no or minimal user input once the 2D image is selected.

In addition or as an alternative to the automated determination and placement of 3D objects from a user selected image as described above, the systems and methods described in the present disclosure may also permit the user select 3D models in a layout or series of layouts and then select where the 3D models should be placed starting with a mounting point. Using this approach, objects can be chosen out of one or more, or multiple, layouts and combined to create a unique 3D arrangement, merging favorite objects of each layout as combined 3D models in a virtual environment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting the breadth, scope, or applicability thereof. It should be noted that for clarity and ease of illustration these drawings are not necessarily made to scale.

FIG. 12 illustrates a function call to import an array of zone products as 3D models in a virtual environment, in accordance with an example described herein.

The figures are not intended to be exhaustive or to limit the invention to the precise form disclosed. It should be understood that the invention can be practiced with modification and alteration and that the disclosed technology be limited only by the claims and the equivalents thereof.

DETAILED DESCRIPTION OF THE EMBODIMENTS

Figure 1:
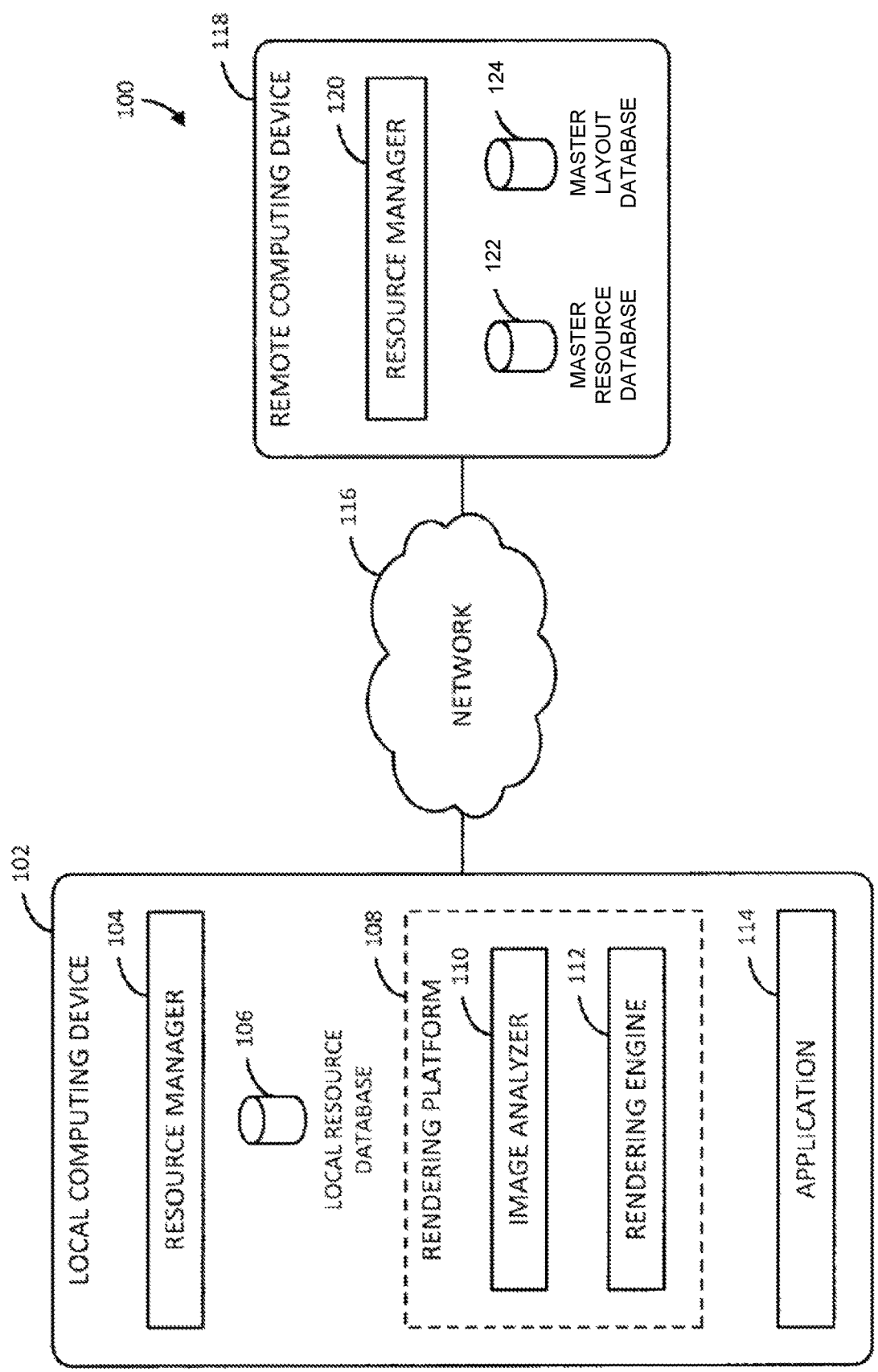
FIG. 1 is an example block diagram of at least a system for 3D placement of 3D models based on a 2D image, in accordance with the embodiments disclosed herein.

FIG. 1 is an example system 100 for the 3D placement of 3D models from a 2D image according to the present disclosure. In the example system 100, local computing device 102 and remote computing device 118 may be communicatively coupled via network 116. The illustrative local computing device 102 includes a resource manager 104 and an application 114. Application 114 of local computing device 102 (e.g., a 3D room designer application, a web browser application, or other software application installed with local computing device 102) may be displayed by the interface of local computing device 102 for the user to interact with (e.g., via a touchscreen display), including interactions to compose a virtual reality setting, placing 3D models in a virtual environment based on a 2D image, or other interactions discussed herein. Application 114 may be embodied as any combination of hardware, firmware, software, or circuitry usable to perform the functions described herein.

Local computing device 102 may comprise a smartphone, tablet, laptop, wearable electronic device, or other computing devices that provide an interface for displaying the virtual environment with 3D models placed within it. Computer-readable instructions incorporated with local computing device 102 are configured to instruct the processor of local computing device 102 on the placement and display of the 3D models, as further described herein.

Figure 2:
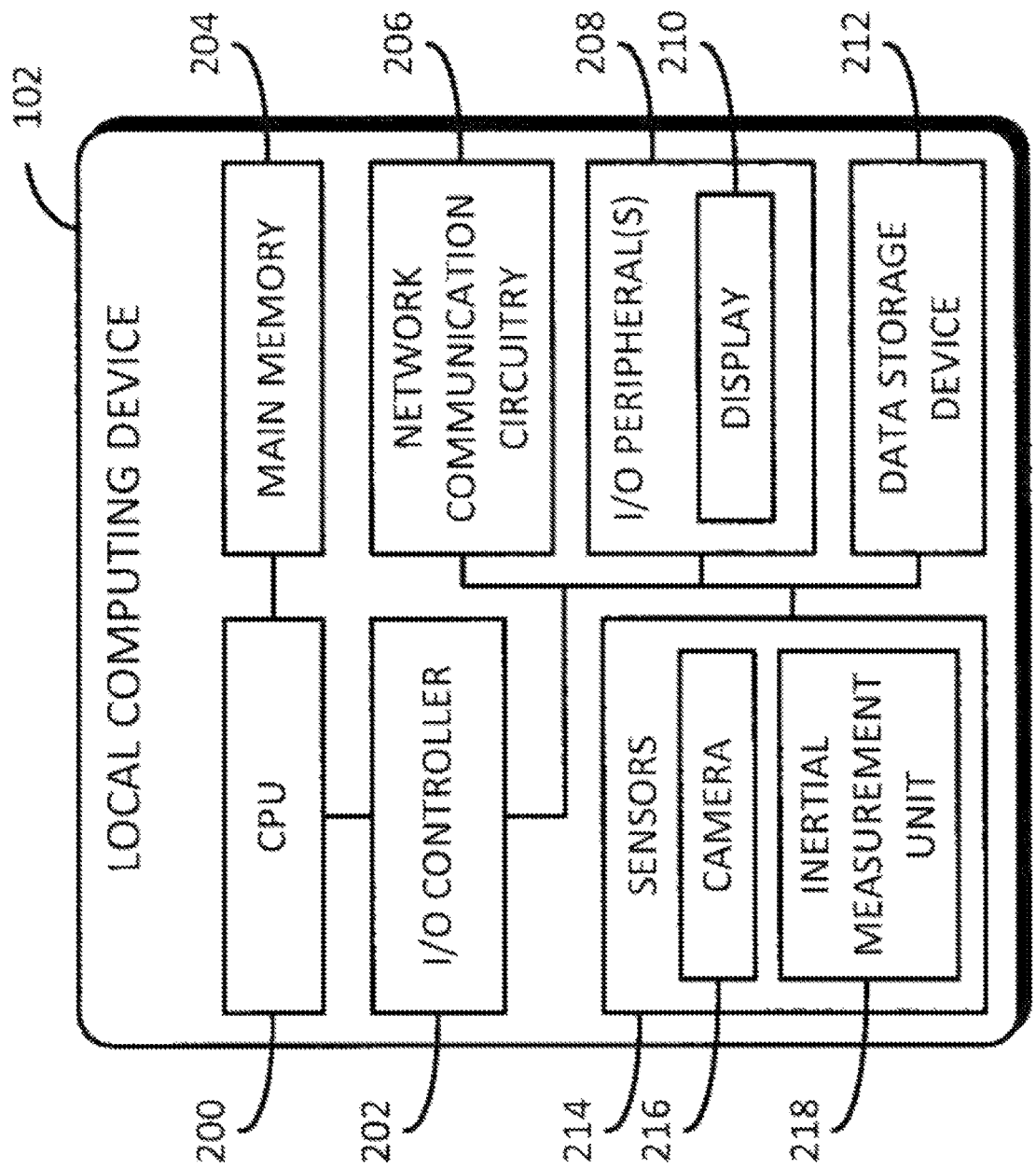
FIG. 2 is an example block diagram of at least one computing device of the system of FIG. 1, in accordance with the embodiments disclosed herein.

FIG. 2 illustrates local computing device 102, in accordance with the embodiments disclosed herein. Local computing device 102 may include a central processing unit (CPU) 200, input/output (I/O) controller 202, memory 204, network communication circuitry 206, one or more I/O peripherals 208, data storage device 212, and various sensors 214. Local computing device 102 may include additional, fewer, and/or alternative components to those of the illustrative local computing device 102, such as a graphics processing unit (GPU). One or more of the illustrative components may be combined on a single system-on-a-chip (SoC) on a single integrated circuit (IC). The type of components of local computing device 102 may be predicated upon the type and/or intended use of local computing device 102.

CPU 200, or processor, may be embodied as any combination of hardware and circuitry capable of processing data. Local computing device 102 may include more than one CPU 200. CPU 200 may include at least one processing core (not shown), such as in single-core processor architecture, or multiple processing cores, such as in multi-core processor architecture. Irrespective of the number of processing cores and CPUs 200, CPU 200 may be capable of reading and/or executing program instructions. CPU 200 may include cache memory (not shown) that may be integrated directly with CPU 200 or placed on a separate chip with a separate interconnect to CPU 200. In one or more scenarios, pipeline logic may be used to perform software and/or hardware operations (e.g., network traffic processing operations), rather than commands issued to/from CPU 200.

I/O controller 202, or I/O interface, may be embodied as any type of computer hardware or combination of circuitry capable of interfacing between input/output devices and local computing device 102. Illustratively, I/O controller 202 may be configured to receive input/output requests from CPU 200, and send control signals to the respective input/output devices, thereby managing the data flow to/from local computing device 102.

Memory 204 may be embodied as any type of computer hardware or combination of circuitry capable of holding data and instructions for processing. Such memory 204 may be referred to as main or primary memory. In one or more scenarios, one or more components of local computing device 102 may have direct access to memory, such that certain data may be stored via direct memory access (DMA) independently of CPU 200.

Network communication circuitry 206 may be embodied as any type of computer hardware or combination of circuitry capable of managing network interfacing communications (e.g., messages, datagrams, packets, etc.) via wireless and/or wired communication modes. Network communication circuitry 206 may include a network interface controller (NIC) capable of being configured to connect local computing device 102 to a computer network, as well as other devices.

I/O peripherals 208 may be embodied as any auxiliary device configured to connect to and communicate with local computing device 102. For example, I/O peripherals 208 may include but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output). The illustrative I/O peripherals 208 includes a display, which may be embodied as a touchscreen display capable of receiving user input via touch (e.g., one or more fingers, a stylus, etc.).

I/O peripherals 208 may be connected to local computing device 102 via a cable (e.g., a ribbon cable, a wire, a universal serial bus (USB) cable, a high-definition multimedia interface (HDMI) cable, etc.) of local computing device 102. In one or more scenarios, the cable may be connected to a corresponding port (not shown) of the local computing device 102 for which the communications made therebetween can be managed by I/O controller 202. I/O peripherals 208 may be connected to local computing device 102 via a wireless mode of communication (e.g., Bluetooth®, Wi-Fi®, etc.) which can be managed by network communication circuitry 206.

Data storage device 212 may be embodied as any type of computer hardware capable of the non-volatile storage of data (e.g., semiconductor storage media, magnetic storage media, optical storage media, etc.). Such data storage devices 212 are commonly referred to as auxiliary or secondary storage and may be used to store a large amount of data relative to the memory 204 described above.

Illustrative sensors 214 include camera sensor 216 and inertial measurement unit (IMU) sensor 218. Sensors 214 may include one or more additional sensors 214. Camera sensor 216 may be embodied as any type of image sensor (e.g., complementary metal-oxide-semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, or any other image sensor technology that can generate digital image frames.

IMU sensor 218 may include one or more software or hardware gyroscopes to measure the orientation of local computing device 102 (e.g., a 3-axis gyroscope), accelerometers to measure the proper acceleration of the local computing device 102 (e.g., a 3-axis accelerometer), magnetometers to measure the direction of the Earth's magnetic field relative to local computing device 102 (e.g., a 3-axis magnetometer), or any other type of inertial motion measurement software/hardware usable to perform the functions described herein (e.g., measure motion along three perpendicular linear axes and the rotation around each of the three perpendicular linear axes).

Illustrative sensors 214 may be used to determine one or more measurements of the room. For example, local computing device 102 may be placed in a room and/or moved to scan a room. The measurements may be determined by capturing one or more images using camera sensor 216 and correlating the scale (e.g., of a size marker, etc.) to determine actual measurements and placements of structural elements (e.g., a window, door, preexisting counter or furniture, etc.). Other known algorithms may be implemented without diverting from the essence of the disclosure. The room measurements may be stored in local resource database 106 and/or transmitted to remote computing device 118.

Referring back to FIG. 1, local computing device 102 may comprise resource manager 104, local resource database 106, rendering engine 108, image analyzer 110, rendering engine 112, and application 114.

Resource manager 104 may be embodied as any type of firmware, hardware, software, circuitry, or a combination thereof, which may be configured to manage the 3D model data stored in local resource database 106. Resource manager 104 may be configured to receive a request from application 114 that includes identifying information of objects that are to be rendered as 3D models from the 3D model data. Upon receiving the request, resource manager 104 may be configured to determine whether the corresponding 3D model data are stored in local resource database 106 (e.g., via a read/query operation). If so, resource manager 104 transmits the 3D model data to rendering engine 108 such that rendering engine 112 of rendering engine 108 can render the object as a function of the 3D model data received from resource manager 104 local to local resource database 106 or resource manager 120 that is remote from local resource database 106 at remote computing device 118. If resource manager 104 determines that one or more, or all, of the 3D model data may be stored in local resource database 106, resource manager 104 may be configured to retrieve the 3D model data from local resource database 106 and transmit them to application 114.

Resource manager 104 may be configured to determine that a 3D model data is not stored in local resource database 106. Resource manager 104 may transmit a request to master resource database 122 of remote computing device 118 requesting the missing 3D model data. The request may be usable by resource manager 120 of remote computing device 118 to determine which 3D model data is being requested and return the requested 3D model data to resource manager 104 of local computing device 102. Resource manager 104 may store the 3D model data received from remote computing device 118 to local resource database 106. Resource manager 104 may transmit the 3D model data to rendering engine 108 such that rendering engine 112 of rendering engine 108 can render the 3D model object as a function of the 3D model data received from resource manager 104. Accordingly, resource manager 120 can retrieve the requested 3D model data from the master resource database 122 of the remote computing device and return them to resource manager 104 via network 116.

Rendering engine 108 may be embodied as any combination of hardware, firmware, software, or circuitry usable to perform the functions described herein. The illustrative rendering engine 108 includes image analyzer 110 and rendering engine 112, each of which may be embodied as any type of firmware, hardware, software, circuitry, or a combination thereof, that may be configured to perform the functions described herein. In one or more scenarios, the resource manager 104, image analyzer 110, and/or rendering engine 112 may include one or more computer-readable mediums (e.g., memory 204, data storage device 212, and/or any other media storage device) having instructions stored thereon and one or more processors (e.g., the CPU 200) coupled with the one or more computer-readable medium and configured to execute instructions to perform the functions described herein.

Image analyzer 110, which may be embodied as any type of firmware, hardware, software, circuitry, or a combination thereof, may be configured to analyze the captured image to determine one or more features of the images captured by local computing device 102, or more particularly by camera sensor 216 of local computing device 102.

Image analyzer 110 may analyze a 2D image, including the room layout, objects in the room, placement of those objects, and other information. 3D model data and/or metadata may correspond with each of the features in the 2D image. The placement of the objects in the 2D image may be inspirational design elements for the user to select to place in a virtual environment. Image analyzer 110 may add or tag metadata in the photograph by comparing objects in the 2D image with stored data in local resource database 106 for corresponding shapes, colors, textures, patterns, labels, or other object details discussed herein. Any correlations between objects in the 2D image and stored 3D model data may help identify actual products (e.g., SKU, etc.) of the objects in the 2D image.

In some examples, the data store of 2D images may include high-resolution photographs. This may help with determining 3D model data, including the make and model of the object that may be printed on the object, a tag attached to the object or other object identifiers. Image analysis for object recognition or other known technologies may also be used to identify the objects.

Image analyzer 110 may also analyze features of the room depicted in the 2D image and store the features as 3D model data or other data (e.g., metadata). For example, a 2D layout may be determined from a photograph. The metadata may identify physical limitations of the room depicted in the 2D image where an object cannot be physically placed in a corresponding virtual environment. Illustrative metadata, data structure, and function calls in association with dynamically accessing data to populate the virtual environment is provided with FIGS. 12-14.

In some examples, the 3D model data and/or metadata may be provided by an administrative user and/or may be imported from an entity's product catalog database. The metadata may identify the SKU, dimensions, preferred placement (e.g., floor, wall, on top of another 3D model like a table, etc.), or other information of the object. In some examples, the metadata may correspond with product descriptions in an entity's product catalog. The metadata may be used to generate or implement one or more rules associated with the object.

Rendering engine 112, which may be embodied as any type of firmware, hardware, software, circuitry, or a combination thereof, may be configured to generate a 3D model from 3D model data, such as may be received from the master resource database 122 of remote computing device 118 and stored in local resource database 106 of local computing device 102. The 3D model may be rendered using 3D model data, and placed as a 3D model in the virtual environment pursuant to placement and rendering rules defined by the system. It should be appreciated that rendering engine 112 may be configured to render the objects. Such rendering can be performed in real-time (e.g., real-time rendering) or ahead of time (e.g., pre-rendering). When the rendering is performed in real-time (i.e., real-time rendering), for example, a wireframe object stored as 3D model data of the object may be determined and a skin/pattern may be added as an overlay of the wireframe object at run-time. The rendered object (e.g., the 3D model) can appear to be unique at the display of local computing device 102, whereas the dimensions, skin/pattern, and other features of the object are stored and provided to the display in real-time.

Rendering images refers to a series of calculations that are performed to generate a 3D model using rendering engine 112. In other words, each of the 3D models represent a mathematical representation of points and surfaces (e.g., vertices and polygons), generated from 3D model data, in the respective virtual environment by the rendering engine. Such rendering can be performed in real-time (e.g., real-time rendering) or ahead of time (e.g., pre-rendering). While pre-rendering is typically used for creating movies, real-time rendering is often used for rendering scenes in video games or augmented reality or virtual reality settings.

In one or more techniques, the virtual environment may correspond with a virtual reality environment configured on a local computing device 102. At least one object corresponding with a 3D model that is rendered in the virtual reality environment using 3D model data may be selected for placement in the virtual reality environment. Information may be determined regarding a fit, a location, and/or compatibility of at least one 3D model relative to the virtual reality environment. The 3D model may be added to the virtual reality environment based, at least in part, on 3D model data. The virtual reality environment may be rendered on a display of local computing device 102.

As an illustrative example, the 3D models may be placed in the virtual environment and the system may determine an amount of usable space that is remaining (e.g., after the first 3D model is placed). For example, when a refrigerator is placed on a wall, the dimensions of the wall that is not covered by the refrigerator may be determined and identified as usable space, causing the refrigerator to act as an mounting point for placement of other 3D models in the virtual environment. Additional 3D models may be identified that can fit, in their rendered state (based on 3D model data), in the remaining usable space. In another example, when a refrigerator is placed on a wall, the corners, doorways, and windows may be determined and identified as non-usable space. Additional 3D models may be identified that can fit in the remaining usable space and may be placed accordingly by the rendering engine.

In some examples, the 3D models may be selected to satisfy a placement rule. For example, when the virtual environment is a kitchen, a placement rule corresponding with this virtual environment may include placing a stove, a sink, and a refrigerator in a triangle layout representing traffic flow within the kitchen (e.g., a workable triangle). Similarly, 3D models that correspond with the stove, sink, and refrigerator may be placed within a triangle configuration.

In some examples, the fit, location, compatibility, inspirational design elements or room configuration, etc. may be analyzed to determine one or more additional 3D models that are needed for a virtual environment. For example, if the cabinets do not fill a full wall of the environment, a spacer that corresponds with the additional space or gap in the environment may be identified from the master resource database 122 or local resource database 106. The object may be provided at the display of local computing device 102 and/or added to a virtual shopping cart (with the other objects) so that the user may purchase the product corresponding with the 3D model displayed in the virtual environment.

Application 114 may be embodied as any type of network-based software application (e.g., cloud application, network application, software-as-a-service (SaaS) application, etc.) configured to communicate with the remote computing device 118 (e.g., in a client-server architecture) over network 116. As described previously, application 114 may be configured to serve as a software-based interface between the user (e.g., via a graphical user interface (GUI) of the application) and resource manager 104.

Application 114 may be configured to interface with image analyzer 110 to retrieve the identified 3D model data of objects in a 2D image and rendering engine 112 to provide the 3D model data to be rendered in the virtual environment. In one or more scenarios, resource manager 104 may be a portion of application 114. In other words, resource manager 104 may be installed with the application, such that the initialization and/or the population of the 3D model data of local resource database 106 is relative to the installation of application 114 and/or the execution of application 114. One or more settings of resource manager 104 may be controlled by the user via the user interface of application 114.

In some examples, resource manager 104, rendering engine 108, image analyzer 110, rendering engine 112, and/or application 114 may be implemented in a cloud-based platform. The computational features of each engine may be performed as a service or function remotely from local computing device 102 and provided via network 116 to local computing device 102.

Remote computing device 118 may be embodied as any type of computing and/or storage device capable of performing the functions described herein. For example, remote computing device 118 may be embodied as, but is not limited to, one or more servers (e.g., stand-alone, rack-mounted, etc.), compute devices, storage devices, routers, switches, and/or combination of compute blades and data storage devices (e.g., of a storage area network (SAN)) in a cloud architected network or data center. As such, while remote computing device 118 is illustrated as a single computing device, in one or more scenarios, remote computing device 118 may include more than one computing device (e.g., in a distributed computing architecture), one or more, or each, of which may be usable to perform at least a portion of the functions described herein.

Remote computing device 118 may contain like components to that of local computing device 102 of FIG. 2. Accordingly, such like components are not described herein to preserve the clarity of the description. In one or more scenarios in which remote computing device 118 may include more than one computing device, one or more, or each, computing device of remote computing device 118 may include different components (i.e., hardware/software resources), the types of which may be predicated upon the type and intended use of each computing device. For example, one or more computing devices of remote computing device 118 may be configured as a database server with less compute capacity relative to the compute capacity of another of the computing devices of remote computing device 118. Similarly, one or more other computing devices of remote computing device 118 may be configured as an application server with more compute capacity relative to the compute capacity of another computing device of remote computing device 118.

Resource manager 120 can retrieve requested 3D model data from the master resource database 122 of remote computing device 118 and return them to resource manager 104 of local computing device 102 via network 116.

Network 116 may be implemented as any type of wired and/or wireless network, including a local area network (LAN), a wide area network (WAN), a global network (the Internet), etc. Accordingly, network 116 may include one or more communicatively coupled network computing devices (not shown) for facilitating the flow and/or processing of network communication traffic via a series of wired and/or wireless interconnects. Such network computing devices may include but are not limited, to one or more access points, routers, switches, servers, computing devices, storage devices, etc.

In some examples, product data may be part of 3D model data and may be stored in master resource database 122, which may comprise a content management system ("CMS"). Product data may refer to a subset of 3D model data that may be mapped to a unique product identifier. The product corresponding to the 3D model data may have physical attributes in a real world environment and the attributes may be stored as 3D model data, such as, for example, dimensions and/or type of surface on which the 3D model of such a product may (e.g., must) be placed in a virtual environment (e.g., wall, floor, and/or ceiling). Master resource database 122 may comprise metadata to identify limitations associated with the placement of 3D models in the virtual environment. Products in this context may represent distinct 3D models that can be rendered and placed in a virtual environment, based on the attributes for the object stored as 3D model data. Products may represent a retail product that can be purchased by a user of a local computing device 102.

In one or more scenarios, master resource database 122 further comprises 3D model data, as discussed herein. For example, 3D model data may include a wire frame for an object and skin or physical attributes for the object, including for example color, texture, material, default dimensions of the object, lighting, depth, and/or other physical attributes. 3D model data may also include information relating to the 3D model's relationships to other 3D models including depth layer, horizontal order, vertical order, rotation offset, height offset, focal group, facing direction, and/or other model information. In some examples, the 3D model data may store relative position information regarding the placement of the 3D model in relation to other 3D models, as the set of 3D models are rendered and placed in the virtual environment Master resource database 122 may comprise one or more objects that correspond with "models" and/or "options." For instance, a rug might come in three sizes and three colors. In commerce systems and/or inventory management systems, there may be a model ID and/or object ID for the rug itself, and/or a SKU for one or more, or each, variation of size and/or color. In one or more scenarios, the model ID and/or object ID alone might be insufficient to provide the user with a rendering of one or more, or all, options of the object. In one or more scenarios, the system may be configured to resolve one or more, or all, possible SKU options, and/or to render 3D models of one or more, or each, object, for example, using one or more, or each, possible variation. In one or more scenarios, the system may process one or more 3D models in relation to one or more 3D model data, including for example, SKU option, and/or may understand the relationship of the model ID and/or object ID to the SKU.

Master resource database 122 may include 2D images that can be stored in any format, including high-resolution photographs. This may help with determining 3D model data, including the make and model of an object depicted in the 2D image.

Other data may be stored in the master resource database 122, or a separate database, including master layout database 124. Master layout database 124 may comprise layout data. The layout may correspond with one or more design elements with specific relative positions and orientations to each other and to surfaces. 2D images may be provided as layouts for placement in a virtual environment. Each layout may correspond with data in a content management system (CMS) database. Each design element in the layout may correspond with a database row in master layout database 124. A layout can have many entries for design elements in the database.

Master layout database 124 may comprise 3D model data corresponding with a virtual environment. The virtual environment may include placement limitations in which 3D models have relative direction and position represented by three linear dimensions. Some examples of a virtual environment include a computer rendering or a virtual environment in 3D perspective, a 3D virtual reality simulation, or an actual space viewed through a computer display system with augmented reality overlays of virtual elements in 3D.

Master layout database 124 may comprise layout data and similar objects that may be determined from the 2D image. For example, the system and method may determine objects, room limitations, and/or possible configurations from the photograph and store the data for future use. In some examples, the photograph may help determine additional object placement rules based on an original design intent of the room, but adjust the layout for different size and shape rooms. The room layout and objects in the photograph may be programmatically grouped in master layout database 124 (e.g., corresponding with a shared parameter or tag, classified as related, etc.).

Master layout database 124 may comprise floorplans and/or building templates. The data may include information to populate the virtual environment, including a room shape (e.g. G shaped, L shaped, and/or T shaped), distance clearance for safety criteria (e.g., accessibility, maneuverability, spacing between walls for accessibility to utility outlets, etc.), workable triangle (e.g., placing a stove, a sink, and a refrigerator in a triangle layout representing traffic flow within a kitchen), or other virtual environment objects (e.g., walkways, ventilation, stairs, windows, doorways, etc.). Additional illustrations of floorplans and/or building templates is provided with FIGS. 4-8.

Master layout database 124 may comprise objects depicted in the 2D image, referred to interchangeably as inspirational design elements. These objects in the 2D image may be grouped in the master layout database 124. In some examples, the objects in the 2D image may be analyzed and tagged with metadata and the metadata may be matched to stored metadata in master layout database 124. A user may select the 2D image at application 114 and rendering engine 112 may select these objects from master layout database 124 and add them to the virtual environment in the same grouping as the 2D image.

Improvements may be useful to provide technologies that may efficiently render objects (e.g., consumer products) that appear in 2D images (e.g., photographs) in the virtual environment(s).

Figure 3:
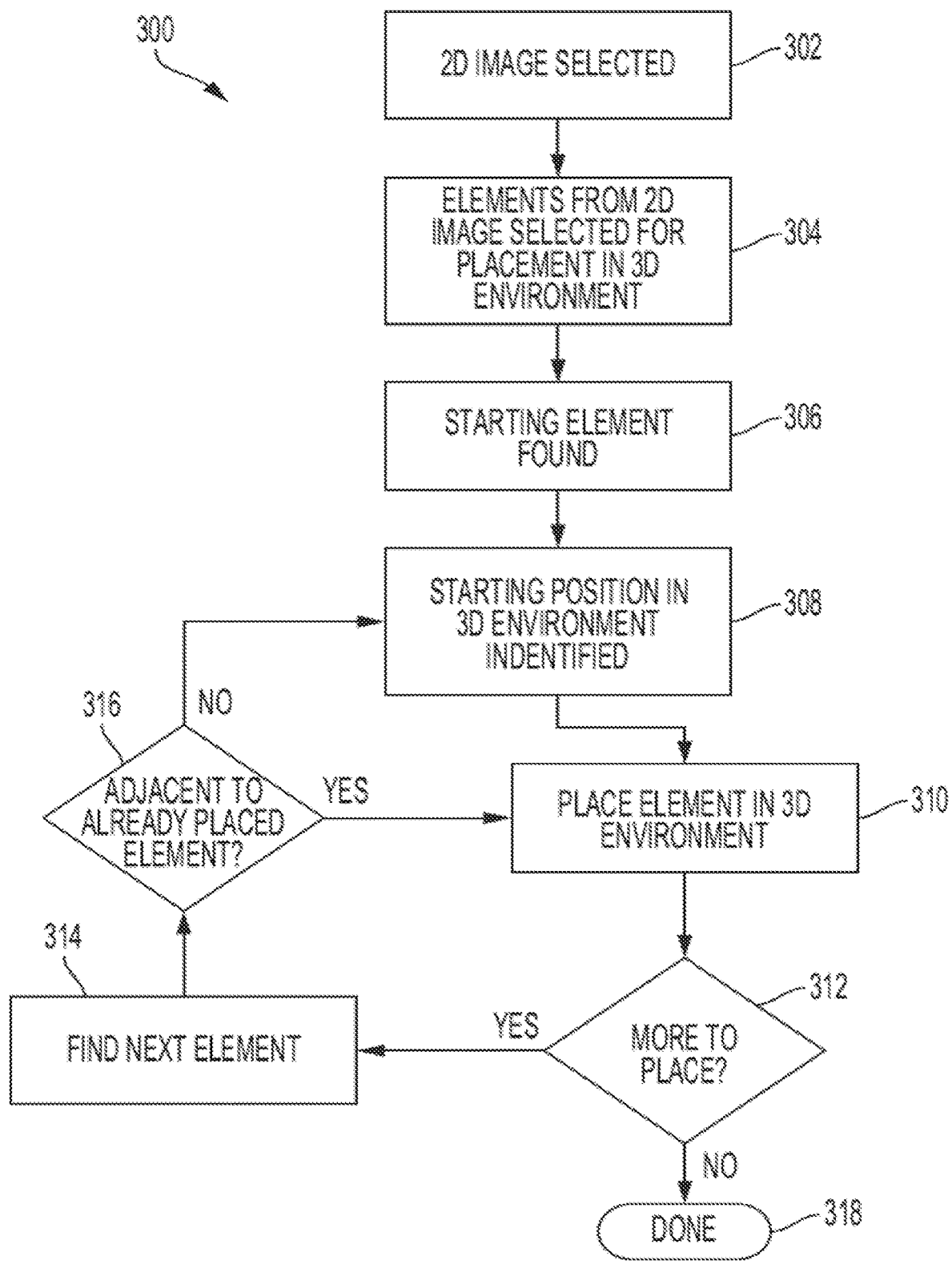
FIG. 3 is an example flow diagram of at least one technique for the 3D placement of 3D models based on a 2D image that may be executed by the computing device of FIG. 1 and/or FIG. 2, in accordance with the embodiments disclosed herein.

FIG. 3 provides an illustrative method 300 for the placement of 3D models into a virtual environment based on a 2D image. Method 300 may correspond with one or more placement rules or collectively as a placement algorithm. Method 300 may be executed by resource manager 104 and application 114 of local computing device 102. It should be appreciated that, prior to method 300 being invoked, local resource database 106 and/or master resource database 122 may include any number of 3D models of various objects.

Generation of a Virtual Environment

At block 302, application 114 may be used to provide a virtual environment on local computing device 102. A virtual environment according to the present disclosure may be any virtual environment or extent to which 3D models have relative direction and/or position represented by three linear dimensions. Examples of a virtual environment according to the present disclosure include a computer rendering in a 3D perspective, a 3D virtual reality simulation, and/or a physical space viewed through display 210 of local computing device 102 with augmented reality overlays of 3D models in 3D. In one or more scenarios, display 210 of local computing device 102 may be a touchscreen display responsive to contact from a human digit, stylus, and/or other input devices. Through interaction with display 210 of local computing device 102 and application 114, 3D boundaries (e.g., outline) of a virtual environment may be established. Overhead lighting, doors, windows, flooring, floor coverings, and/or wall colors, and/or the like may be added to the virtual environment within the three-dimensional boundaries. A 2D image of a desired 3D layout may be selected. Portions of the pixel array of the 2D image may be mapped to 3D model data.

In some examples, the layout, extents, and/or dimensions of the virtual environment may be obtained from master layout database 124. Master layout database 124 may comprise floorplans and/or building templates. In one or more scenarios, the layout and/or dimensions of the virtual environment may be analyzed by local computing device 102 and/or remote computing device 118. Additional layout information may be stored for the virtual environment. For example, the virtual environment may be analyzed and/or categorized, for example, according to shape, (e.g., G shaped, L shaped, and/or T shaped). In one or more scenarios, the virtual environment may be (e.g., automatically) modified, for example, to satisfy criteria including accessibility, maneuverability, and/or safety regulations, among others. For example, the virtual environment may be modified to ensure appropriate spacing between walls for accessibility to utility outlets. In one or more scenarios, the virtual environment may be (e.g., automatically) created and/or modified using one or more procedural algorithms to construct one or more 3D environmental objects that may include including but not limited to walkways, ventilation, stairs, windows, and/or doorways, etc.

In some examples, the one or more rendering engines may be used to render the aforementioned 3D models using rendering rules specifying the generation criteria. For example, the rule set used for procedurally generating doors may include one or more rules specifying that door frames may (e.g., may only) be placed on walls of at least 36" in width and/or 7' of height. The rule set may specify that the door frames might not be placed such that an open door may intersect with another wall on either side of the door frame. In other words, the door frame may (e.g., may only) be placed in locations where the door may be fully opened. For example, the procedural algorithm for creation of stairs may utilize one or rule sets specifying that the height of one or more, or each, step might not exceed 10" and/or may be at least 7", and/or that one or more, or each, step may be (e.g., must be) at least 10" wide. The procedural algorithm may not proceed, for example, if the creation may violate any generation rules. In one or more scenarios, the generation rules may be dynamically set and/or switched at application run time, may be provided by an external source, such as by uploading a file containing formatted rules, and/or may be provided through local resource database 106, among others, for example.

An example of constructing the virtual environment is provided with FIGS. 4-8, which illustrates an interface for defining a virtual environment. For example, the virtual environment may comprise a user-defined space that has one or more walls and at least one delimiter (e.g., open border, virtual limit, walls, doors, window below counter height, etc.). The system may identify walls and combine the walls to form the largest usable space possible for objects of the room. The system may identify which objects are available and maximize the number of objects that could fit in the available space (e.g., 24" space does not fit any of the available cabinets).

Figure 4:
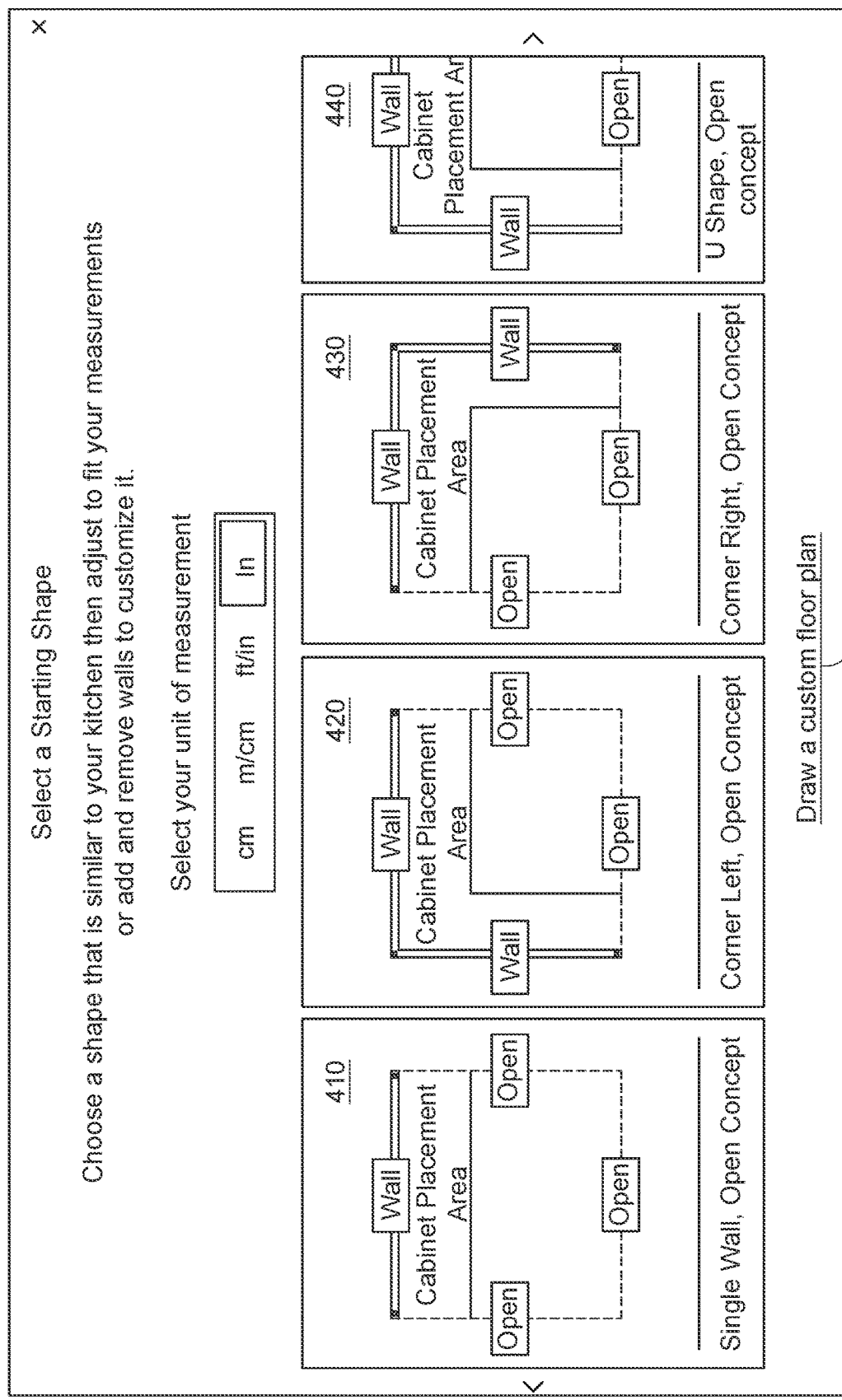
FIG. 4 shows example technology for generating a virtual environment, in accordance with an example described herein.

As illustrated in FIG. 4, the technology for generating a virtual environment is provided. The virtual environment may allow the user to select a starting shape of the virtual environment, including a first option 410 (e.g., single wall with an open concept layout), a second option 420 (e.g., corner left with an open concept layout), a third option 430 (e.g., corner right with an open concept layout), or a fourth option 440 (e.g., U-shape with an open concept layout). The units of measurement may be set to a default value (e.g., centimeters or inches, etc.) or selected by the user through interactions at the user interface. In some examples, the virtual environment may be customized corresponding to a customized floor plan option 450. The customized floor plan may be defined by the user without selecting a predetermined option. virtual environments are provided with FIGS. 5 and 6.

Figure 5:
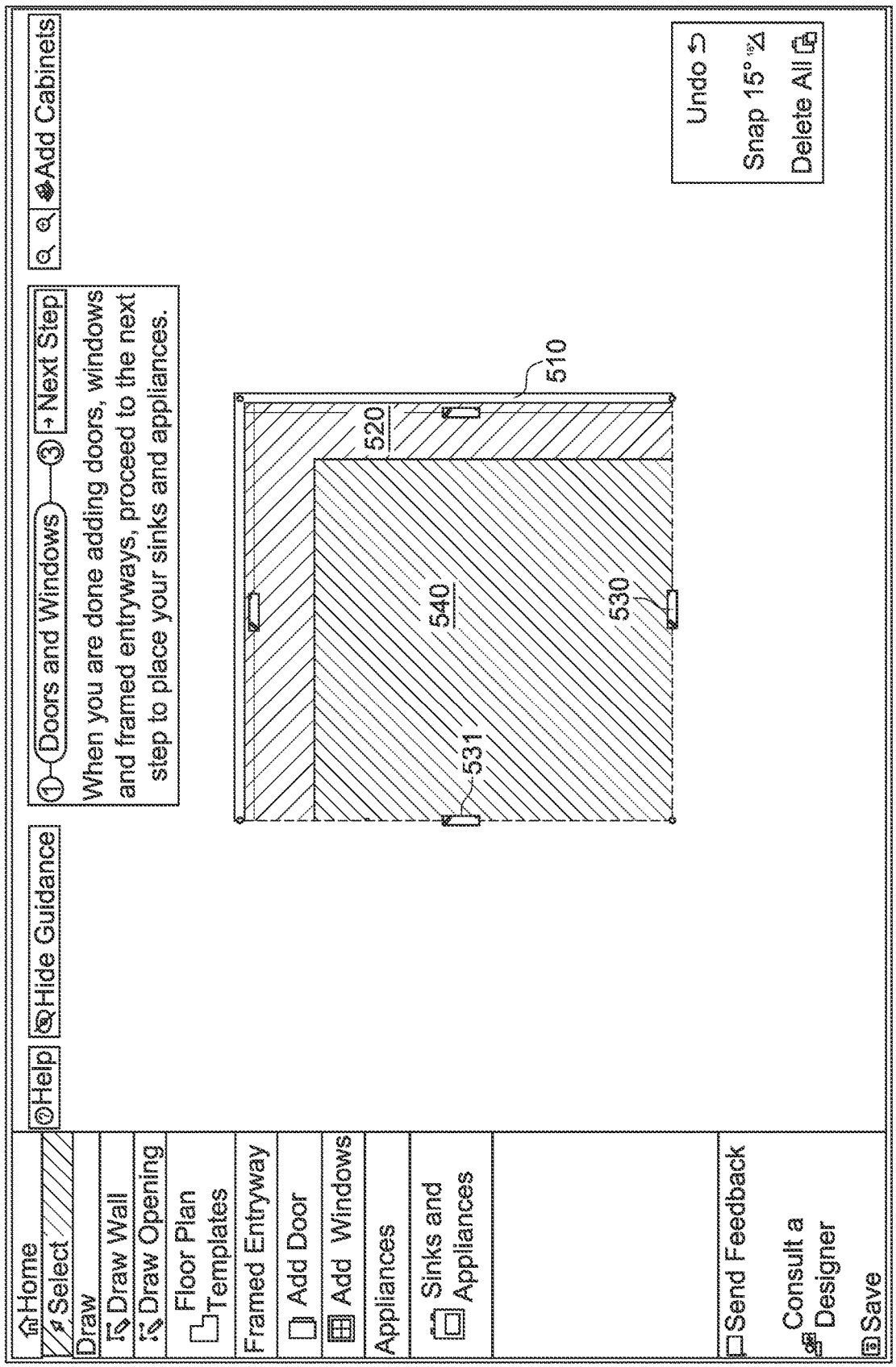
FIG. 5 shows example technology for generating a virtual environment, in accordance with an example described herein.

FIG. 5 also illustrates the technology for generating a virtual environment. This example illustrates third option 430 (e.g., corner right with an open concept layout) from FIG. 4. The exterior outline 510 identifies the walls that define the room. The walls may correspond with structural objects of a building where the room is placed. The virtual environment may mimic a physical environment or a virtualized one.

Interior to exterior outline 510 identifies a virtual area 520 where room objects may be placed inside the room. The room objects may comprise a refrigerator, cabinets, countertops, sink, or other objects described throughout the disclosure.

The virtual environment may also identify one or more measurements of the room along an x-axis 530 and y-axis 531. The measurements may be provided in units that correspond with the default measurement or the selected measurement from the interface illustrated in FIG. 4.

The virtual environment may also identify remaining space 540 in the user-defined space that is surrounded by the one or more walls and at least one delimiter (e.g., open border, virtual limit, walls, doors, window below counter height, etc.). The remaining space 540 may be restricted from placing 3D models that could fit in the available space (which is reserved for virtual area 520 where room objects may be placed inside the room).

Figure 6:
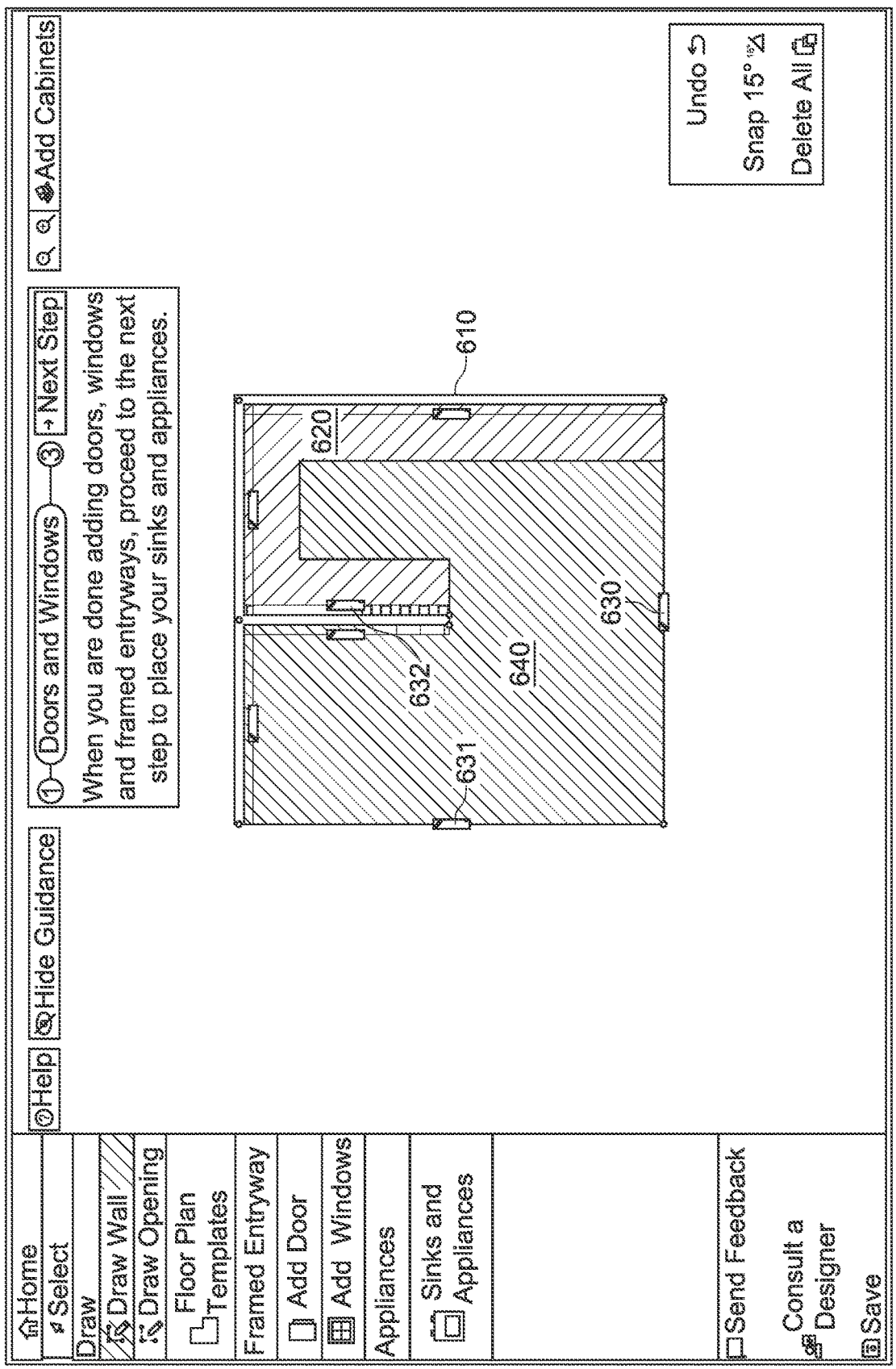
FIG. 6 shows example technology for generating a virtual environment, in accordance with an example described herein.

FIG. 6 also illustrates the technology for generating a virtual environment. This example illustrates a customized floor plan option 450 from FIG. 4. The exterior outline 610 identifies the walls that define the room and any interior walls of the custom-defined virtual environment. The walls may correspond with structural objects of a building where the room is placed. The virtual environment may mimic a physical environment or a virtual environment.

Interior to the exterior outline 610 identifies a virtual area 620 where room objects may be placed inside the room. The room objects may comprise a refrigerator, cabinets, countertops, sink, or other objects described throughout the disclosure.

The virtual environment may also identify one or more measurements along an x-axis 630 and y-axis 631. When interior walls are placed inside the room, measurements 632 of the interior walls may also be provided. The measurements may be provided in units that correspond with the default measurement or the selected measurement from the interface illustrated in FIG. 4.

The virtual environment may also identify remaining space 640 in the user-defined space that is surrounded by the one or more walls and at least one delimiter (e.g., open border, virtual limit, walls, doors, window below counter height, etc.). In this example, the remaining space 640 forms a U-shape. The remaining space 640 may be restricted from placing 3D models that could fit in the available space (which is reserved for virtual area 620 where room objects may be placed inside the virtual environment).

Figure 7:
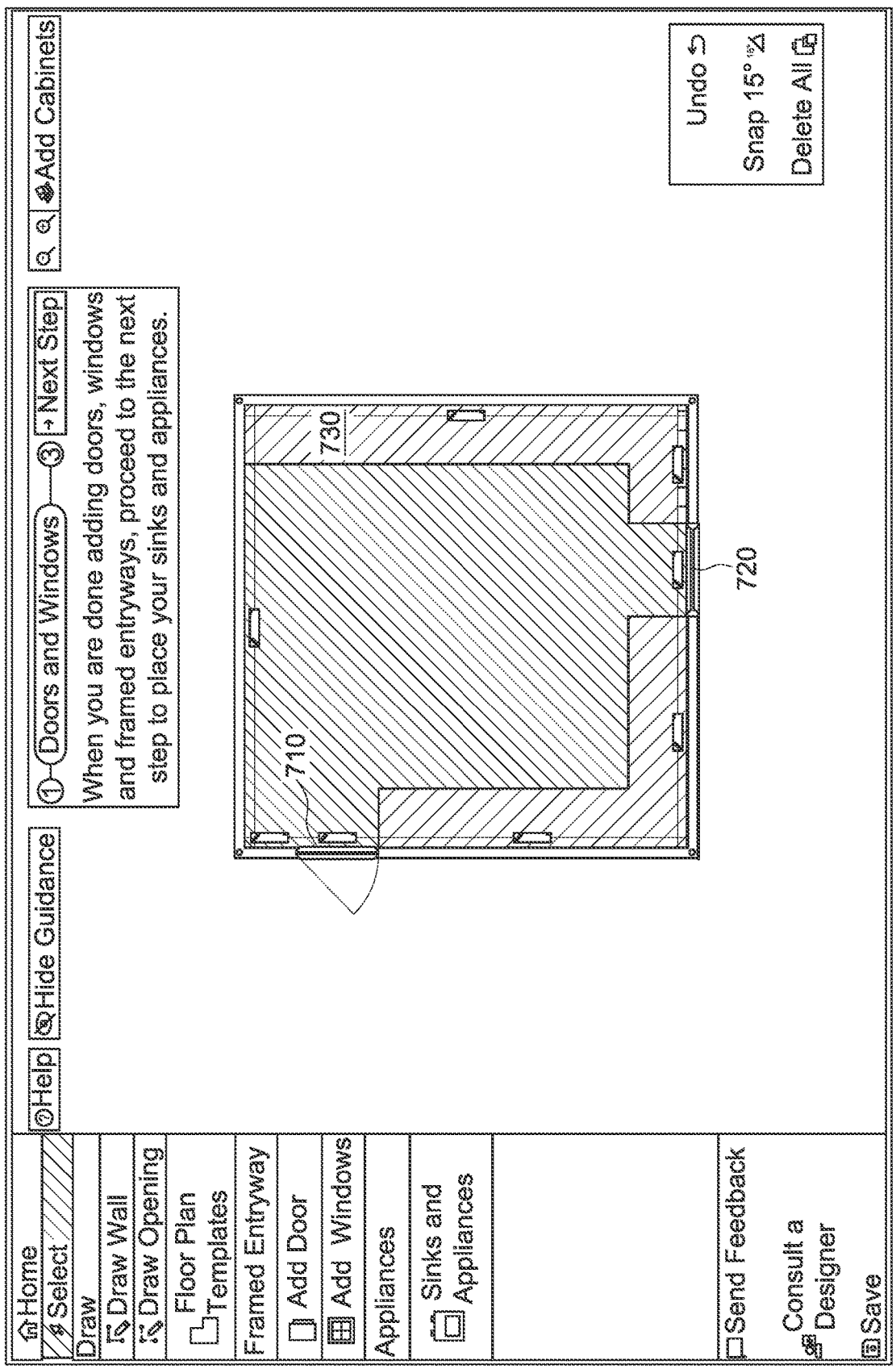
FIG. 7 shows example technology for generating a virtual environment, in accordance with an example described herein.

FIG. 7 also illustrates the technology for generating a virtual environment. This example illustrates an example of a customized floor plan option 450 from FIG. 4. In this example, the placement of a door delimiter 710 and window delimiter 720 restricts the virtual area 730 where room objects may be placed inside the virtual environment.

Figure 8:
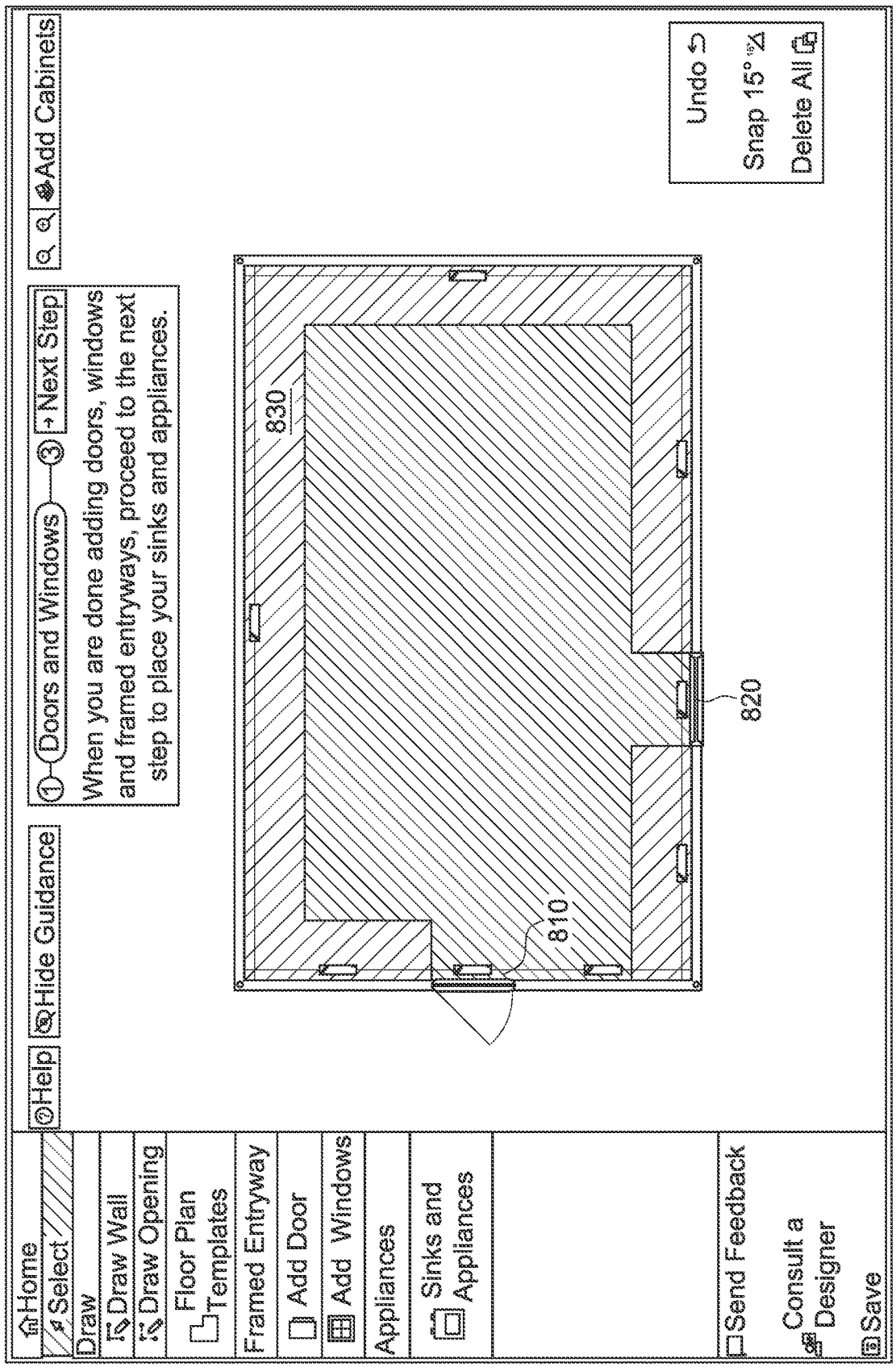
FIG. 8 shows example technology for generating a virtual environment, in accordance with an example described herein.

FIG. 8 also illustrates the technology for generating a virtual environment. This example illustrates an example of a customized floor plan option 450 from FIG. 4. In this example, like in FIG. 7, the placement of a door delimiter 810 and window delimiter 820 restricts the virtual area 830 where room objects may be placed inside the virtual environment.

In comparing FIGS. 7 and 8, the placement of the door delimiter 710 in FIG. 7 restricted the virtual area 730 along the wall based on the placement rules defined for the system. This may permit walking space through the door delimiter 710 and into the room and restrict placement of room objects in that walking space. The placement of door delimiter 810 in FIG. 8 did not include the same restrictions. In this example, the walking space around door delimiter 810 exceeded a threshold value defined in the placement rules to permit placement of room objects along the walls next to the door delimiter 810.

Figure 9:
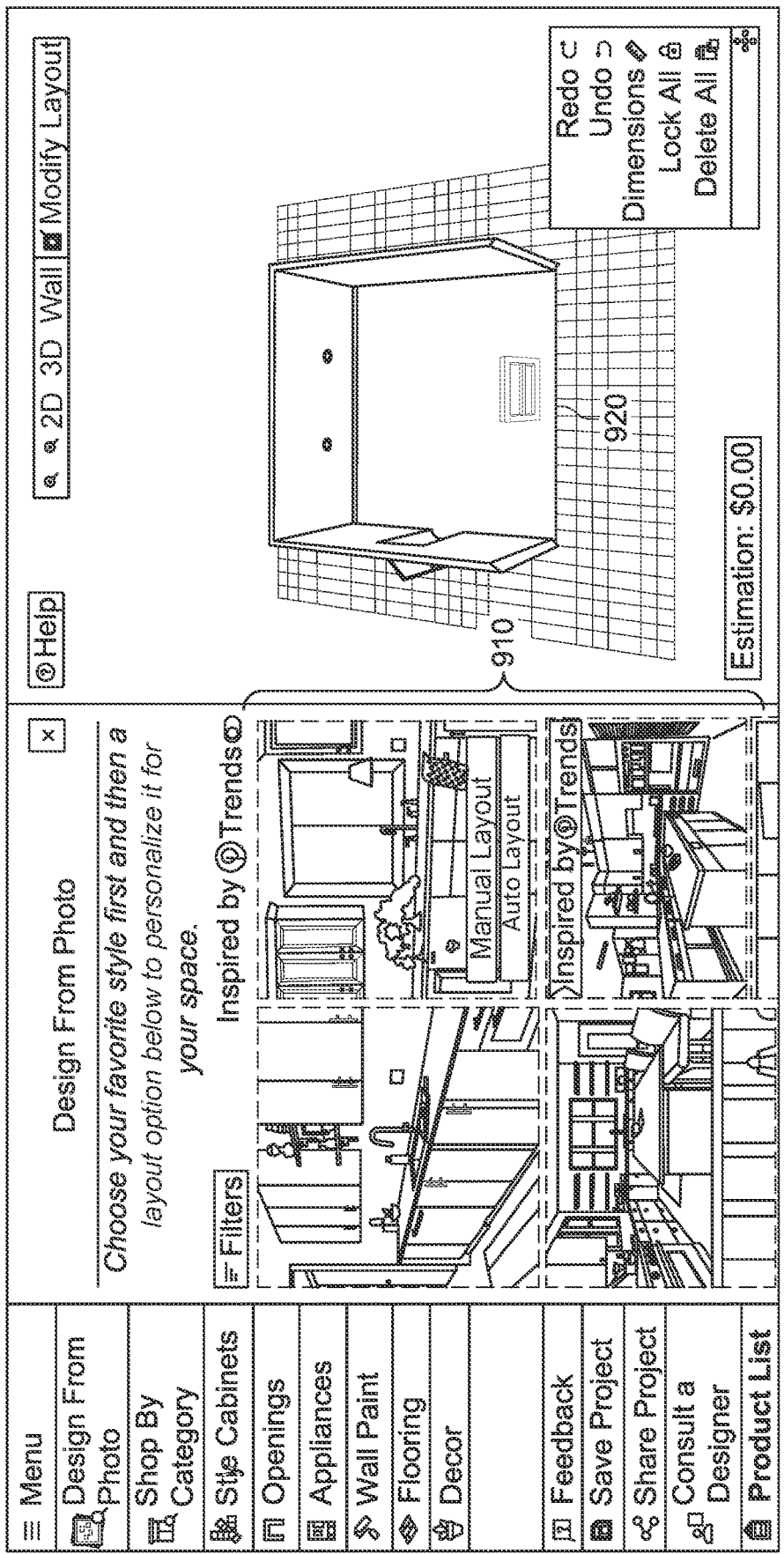
FIG. 9 shows example technology for generating a virtual environment from a 2D image, in accordance with an example described herein.

In some examples, the virtual environment may be determined from a photograph or other 2D image. In FIG. 9, a set of 2D images 910 are provided in a first portion of the interface with a corresponding virtual environment 920 to each 2D image on a second portion of the interface. When one of the 2D images from the set of 2D images 910 is selected from the first portion of the interface, the corresponding virtual environment 920 may be displayed on the second portion of the interface.

Figure 10:
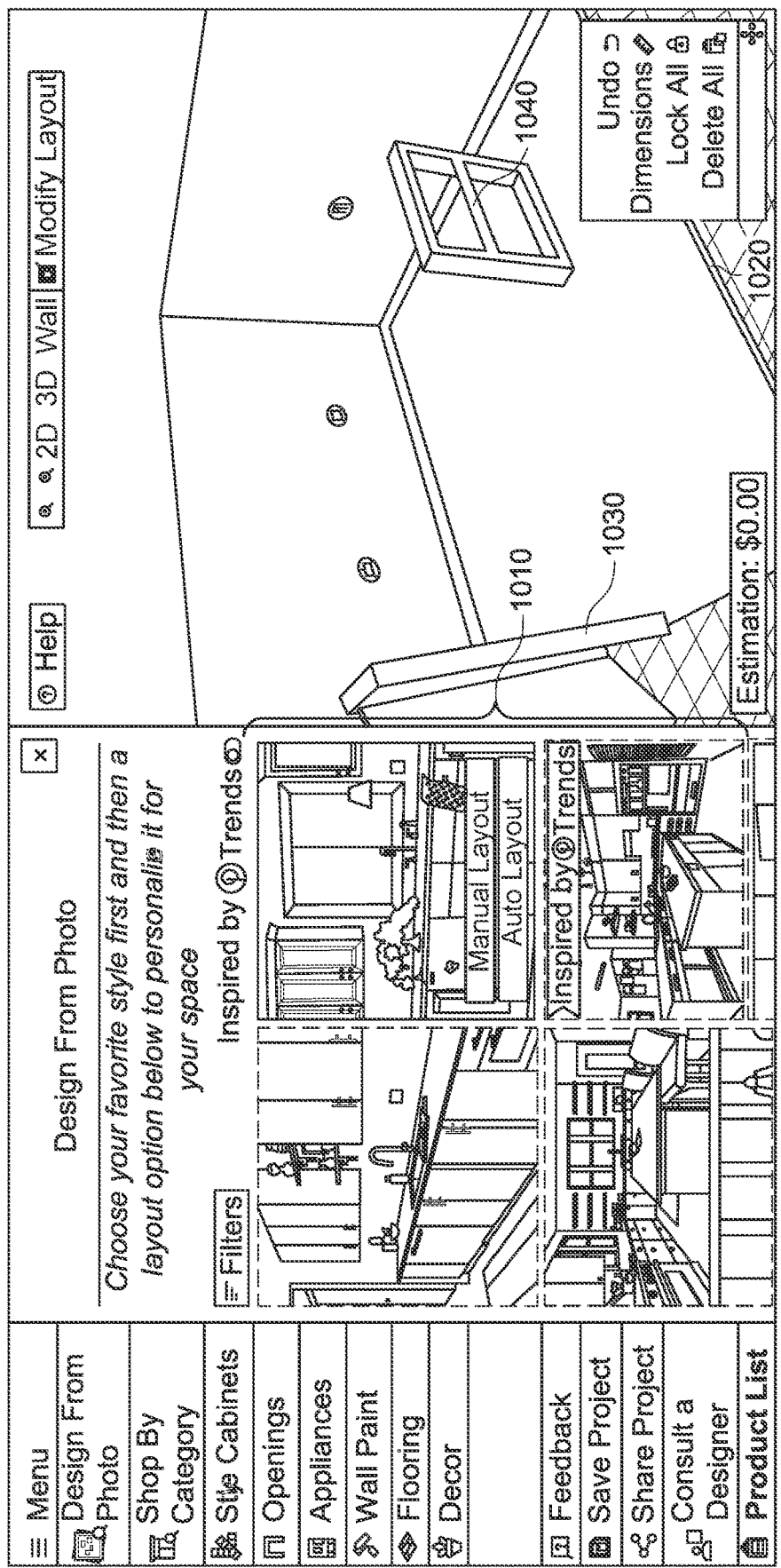
FIG. 10 shows example technology for generating a virtual environment from a 2D image, in accordance with an example described herein.

FIG. 10 illustrates an interactive virtual environment in accordance with providing a set of 2D images in a first portion of the interface with a corresponding virtual environment to each 2D image on a second portion of the interface. For example, once the selection is received from the set of 2D images 1010 from the first portion of the interface, the corresponding virtual environment 1020 may be displayed in the second portion of the interface. virtual environment 1020 may be rotated through interactions with the interface to help identify room objects that are included with the default definition of the virtual environment 1020 corresponding with the selected 2D image 1010. In this example, a door delimiter 1030 and window delimiter 1040 are provided and rotate with the virtual environment 1020.

Figure 11:
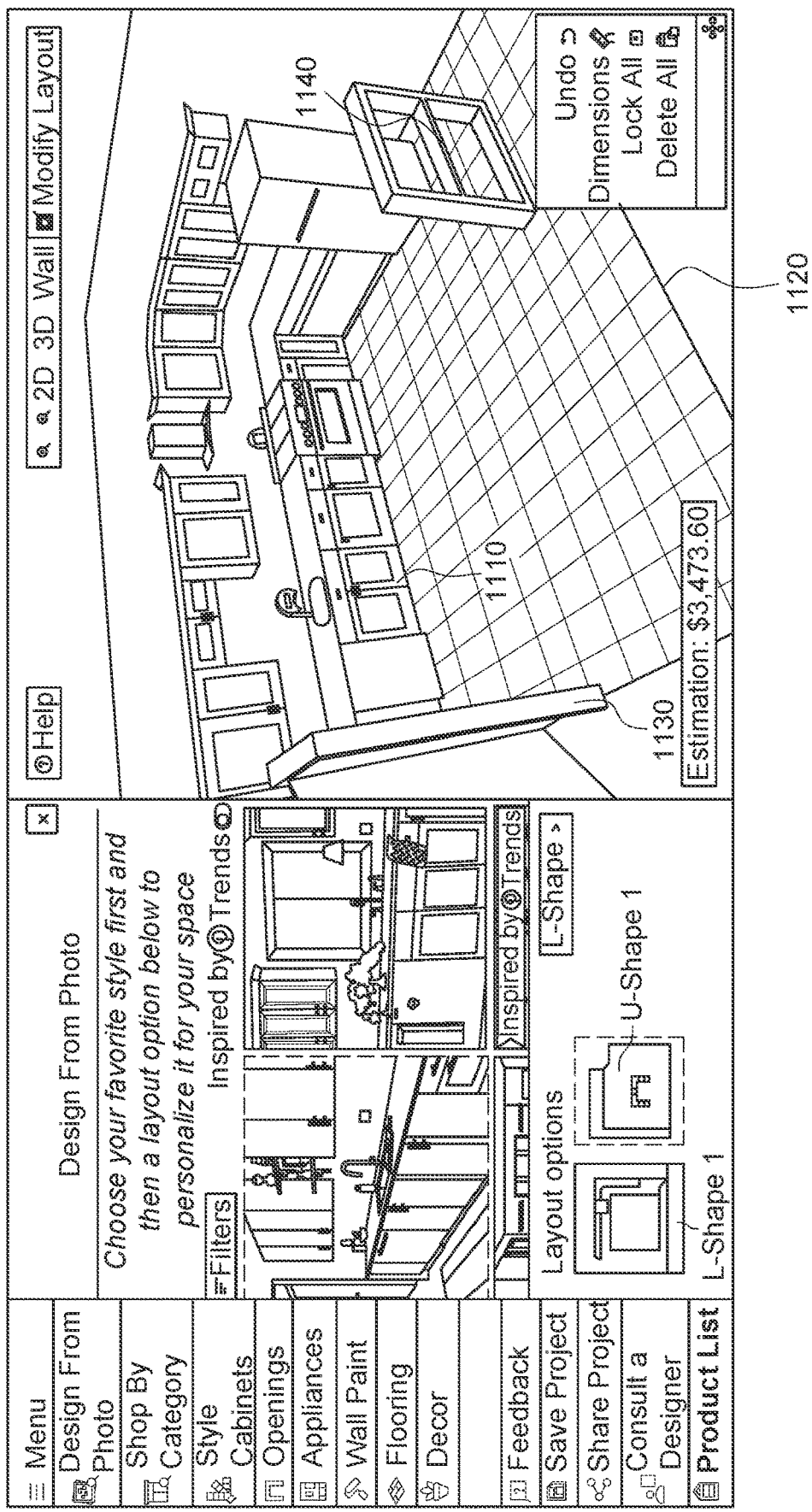
FIG. 11 shows example technology for placing objects in a virtual environment, in accordance with an example described herein.

The placement of 3D models in the room may also be based on photographs or other 2D images, as shown in FIG. 11. For example, once the 2D image is selected, the room objects 1110 may be placed in coordination with the 2D image. Other room objects may remain in the virtual environment 1120 as well, including the door delimiter 1130 and window delimiter 1140. Additional detail about object placement is provided with block 304 of FIG. 3 described below.

In some examples, the one or more procedural algorithm(s) and/or generation rules may determine the metadata associated with an object and pass the metadata as a parameter to a preexisting rule. The metadata may alter the placement of the 3D model associated with the object, even though the rule may be unaltered for the particular placement instance. In some examples, the metadata may define objects in the room (including color, shape, dimension, etc.) to correspond with the 2D image.

In some examples, the 2D image may be provided as at least a part of a presorted selection of one or more inspirational images stored in local resource database 106. In one or more scenarios, the 2D image may be selected from an assortment supplied by an external resource database (e.g., master layout database 124) and/or web service. For example, the 2D image may be selected from a trending list of room arrangements provided by a social media website. The selected 2D image of the inspirational layout may be processed by image analyzer 110 to extract arrangement and/or decor styling information, for example, to guide the (e.g., automatic) selection and/or placement of 3D product models within the virtual environment(s). For example, image analyzer 110 may extract wall color and/or may identify floor covering material from a 2D image that may be uploaded by the user.

Image analyzer 110 may utilize existing computer vision and/or machine learning algorithms to identify the floor, walls, and/or other objects of interest and/or may sample the color and/or patterns visible on one or more, or each, object.

Image analyzer 110 may process the selected 2D image and/or may identify one or more types of objects, for example, with regard to basic function(s), and/or their relative arrangement within the 2D image. The image analyzer may utilize one or more existing machine learning algorithms for performing the aforementioned techniques.

In some examples, the extracted object identifiers may be used to guide the identification and/or selection of similarly functional products available within the local resource database 106. For example, image analyzer 110 may process a 2D image selected by the user and/or may identify a reclining chair in the image by a window. This information may provide a list of available reclining chairs within local resource database 106, for example, with suggestions and/or (e.g., automatic) placement of a most closely resembling product next to a window within the virtual environment.

Image analyzer 110 may process the selected 2D image, for example, in order to identify the exact object within the image so that the manufacturer of the object and/or the availability of the object with respect to a commerce system may be provided to the user. In one or more scenarios, image analyzer 110 may process one or more images in real-time to extract data. In one or more scenarios, image analyzer 110 may run in isolation to extract information on a bulk group of 2D images storing the extracted information within local resource database 106 and/or master storage database 122. In one or more scenarios, image analyzer 110 may be replaced by an existing artificial intelligence and/or machine learning alternative created to fulfill the same operations as image analyzer 110.

In some examples, the virtual environment may be converted into a 2D image representation, for example, to facilitate the creation of a new (e.g., fresh and/or previously unused) arrangement(s) and/or decor style 2D image(s). In one or more scenarios, the conversion of the virtual environment to a 2D image may be performed through rendering engine 108. In one or more scenarios, the conversion of the virtual environment to a 2D image may be performed by remote computing device 118. In one or more scenarios, the conversion of the virtual environment to a 2D image may be performed by a local computing device 104. In one or more scenarios, the 2D image created from the virtual environment may be provided for use by other remote computing operations. For example, the 2D image created from the virtual environment may be provided and/or posted to a social media network that may be made visible to a select list of the user's contacts.

In some examples, the created 2D image from the virtual environment may be processed by image analyzer 110, for example, in order to identify similarities between the created image and other 2D images stored within local resource database 106, master resource database 122, and/or a separate resource database. As an illustrative example, the created 2D image from the virtual environment may be compared against a trending list of similar 2D images that may be provided by a social media network(s). Each of the objects may be associated with metadata that may help place the object in the virtual environment. The data may be received from a file or data store that correlates the 2D image with metadata defined for each of the objects in the image. Illustrative metadata is described throughout the disclosure. In this example, the metadata may comprise an identifier, element identifier or elementId (e.g., reference to the element/wireframe used), product identifier or productId (e.g., identifier of zone product), alignmentType (e.g., where to place product in zone configuration), offset, size (e.g., width in meters of product), priority (e.g., priority of product to be placed in scene with limited space, where the higher value is more likely to be placed), products (e.g., array of zone products), gap (e.g., number value), and gapOnly (e.g., a Boolean value).

FIG. 12 illustrates a function call to import an array of zone products, in accordance with an example described herein. The function call illustrated herein is one sample of the function calls and machine instructions that may import the array of zone products. For example, the objects in the 2D image may be stored as an array of zone products, such that the array data structure can be accessed to receive the related objects for the image. The array data structure can be utilized in populating the display of the virtual environment by, for example, importing the data structure to the system, converting the data to display objects, and exporting the data to the display, as illustrated in FIG. 12.

Figure 13:
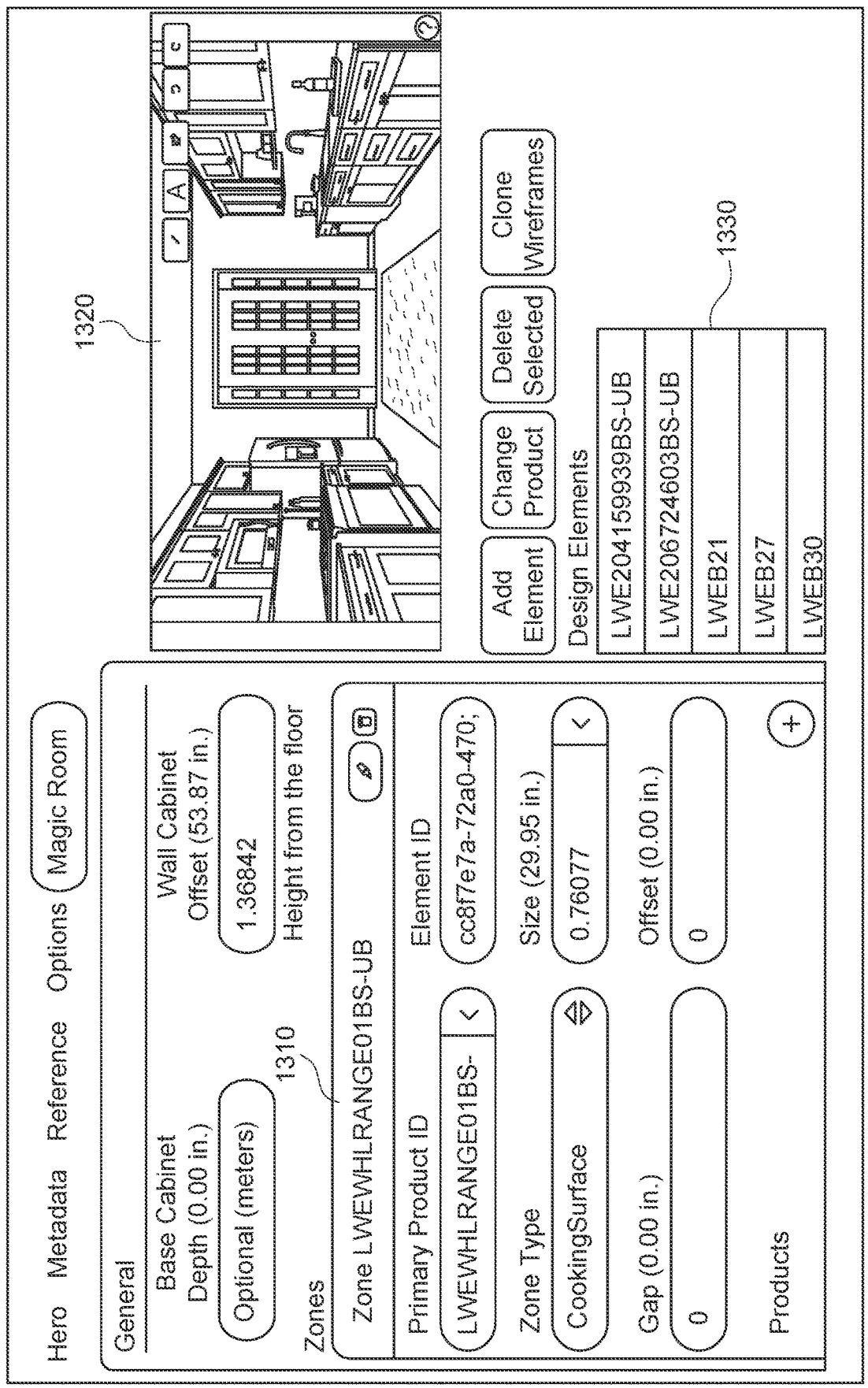
FIG. 13 illustrates the exported metadata at the display, in accordance with an example described herein.

FIG. 13 illustrates the exported metadata at the display. For example, a first zone 1310 is provided with a zone identifier, element identifier, zone type, size, gap, and offset. This illustrated zone corresponds with a refrigerator object, which is placed in the second portion 1320 of the display. The values for each of the metadata described may be defined in a product catalog that is imported to the system or manually determined by a system administrator.

Once the primary product identifier is identified (associated with a first object), other products may be identified as well. Other products may be placed next to first object within the limitations set for the first zone 1310, including other products 1330 listed in the array of zone products. As illustrated, other products 1330 may be listed by the product identifier for each product in the array. Once accessed, the array of zone products may be placed in the virtual environment in accordance with the metadata of the object corresponding with each product. Other products 1330 may be placed in the virtual environment in accordance with the data schema for the array of zone products.

Figure 14:
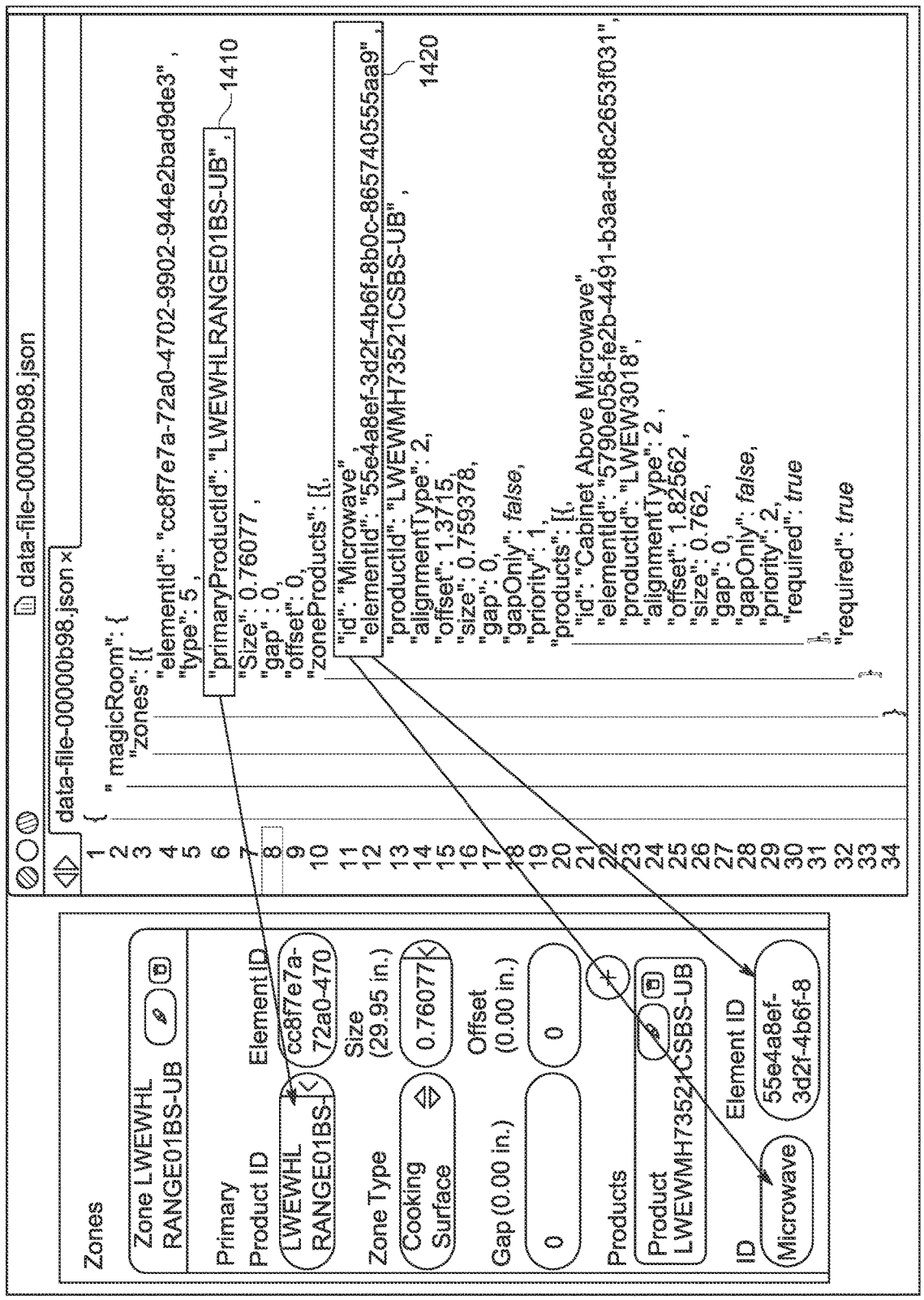
FIG. 14 illustrates a correlation between the data schema and the 3D model data or metadata, in accordance with an example described herein.

FIG. 14 illustrates a correlation between the data schema and the metadata. For example, at line 1410, the data schema may define a primary productID for a first product in the array of zone products. This metadata correlates to displayed metadata in the first zone of the interface. Other information for the product may also be provided, including a zone identifier, element identifier, zone type, size, gap, and offset. Related zone products may also be provided relating to the primary productID, including a plain text identifier (e.g., microwave) and elementID or other metadata 1420, as illustrated in subsequent lines of the array of zone products provided within the data schema may define a primary productID.

Placement of Objects in the Virtual Environment

At block 304 of FIG. 3, a product and/or grouping of products from the 2D image may be selected for placement in the virtual environment established at 302. As described elsewhere herein, a user may indicate which product(s) to render and/or a location at which to begin rendering the 3D model data as 3D models of the products relative to the virtual environment captured by the local computing device 102 (e.g., via display 210 of local computing device 102 or via camera sensor 216 of local computing device 102).

In some examples, the user may (e.g., may only) select a 2D image portraying the desired arrangement and/or decor style for furnishing a room. One or more 3D models matching the selected arrangement and/or decor style may be chosen (e.g., automatically) from local resource database 106. In one or more scenarios, the (e.g., automatically) selected products may be chosen, for example, based on any number of criteria defining the degree to which one or more, or each, product matches the arrangement and/or decor style from the 2D image. In one or more scenarios, the criteria for identifying products matching the arrangement and/or decor style may include: 3D dimensions, color, texture, composing material, and/or function of the products, among others. In some examples, the selected objects may correspond with an inspirational image of a layout and the selected objects may be grouped in master layout database 124.

In some examples, the (e.g., automatically) selected objects associated with soon-to-be-rendered 3D models may be chosen, for example, based on the available/unoccupied space within the virtual environment(s). In one or more scenarios, the placement locations of the (e.g., automatically) chosen 3D models may be determined, for example, based on the arrangement and/or decor style from the 2D image selected. In one or more scenarios, the 3D models of the (e.g., automatically) selected product(s) might not match the products shown in the 2D image but may be chosen, for example, due to: size restrictions of the virtual environment, and/or availability of purchase of the products, and/or other criteria. In one or more scenarios, the (e.g., automatic) selection of 3D models may be chosen, for example, based on one or more applicable rules associating one or more products to one another. For example, the decor options in the selected 2D image may result in the selection of a table lamp. The one or more functional rules of the decor may indicate (e.g., require) that an end table be selected, for example, in order for the table lamp to be placed.

In some examples, selecting of a 2D image to set decor style may include changing one or more visible properties of the virtual environment. The one or more visible properties may include: wall color, floor color, floor covering, ceiling color, and/or ceiling covering, and/or the like, for example, to match the decor style of the 2D image, among other reasons.

Resource manager 104 may determine whether the necessary 3D model data may be stored in local resource database 106. If so, resource manager 104 transmits the 3D model data to rendering engine 108 such that rendering engine 112 of rendering engine 108 can render the object as a function of the 3D model data received from resource manager 104. For example, if resource manager 104 determines that 3D model data for a corresponding 3D model is not stored in local resource database 106, resource manager 104 may transmit a request to a master resource database at a remote computing device (e.g., master resource database 122 of remote computing device 118) requesting the missing 3D model data. The request may be usable by resource manager 120 of remote computing device 118 to determine which 3D model data is being requested and return the requested 3D model to resource manager 104 of local computing device 102. Resource manager 104 may store the 3D model data received from remote computing device 118 to local resource database 106. Resource manager 104 may transmit the 3D model to rendering engine 108 such that rendering engine 112 of rendering engine 108 can render the object as a function of the 3D model data received from resource manager 104.

In some examples, one or more, or each, grouping of products from the 2D image may include a starting element (e.g., mounting point) that forms the mounting for rendering the grouping of products in the virtual environment.

At block 306 of FIG. 3, the starting element for the grouping of products selected at block 304 may be identified. The starting element may be predefined, for example, based on one or more priority values that may be assigned to one or more, or each, element within the 2D image. The highest priority element within the selected group may be taken as the starting element for the placement algorithm. In one or more scenarios, user selection may be used to allow the user to specify the priority of placement. In one or more scenarios, the selected elements may be processed at runtime against a set of rules, for example, to determine placement priority. For example, a rule set may specify that tables have higher placement priority over lamps. The selected elements from the 2D image may be sorted such that one or more, or all, tables may be placed before any lamps are placed, for example.

Figure 15:
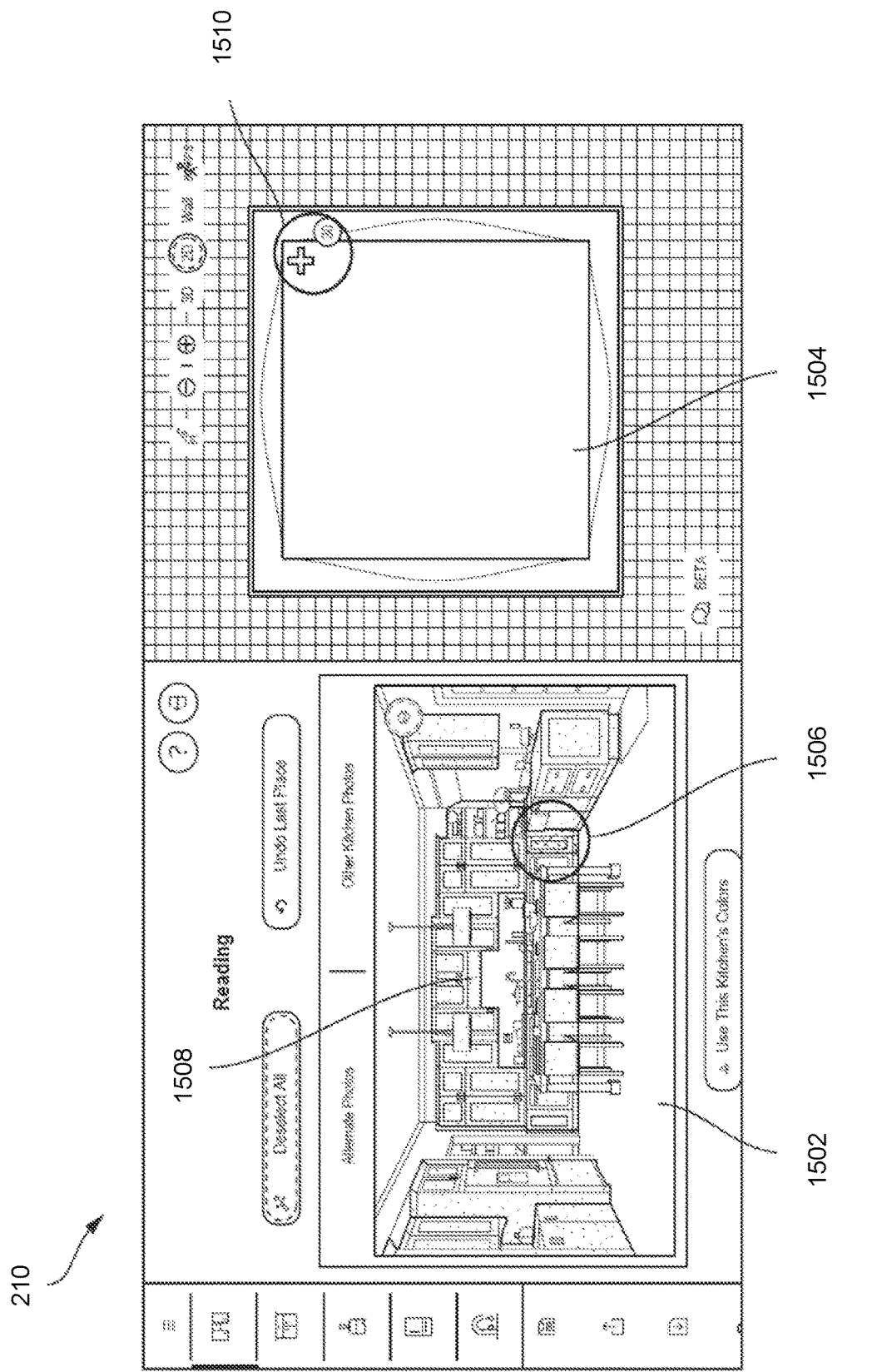
FIG. 15 shows an example technology for the 3D placement of 3D models based on a 2D image according to the present disclosure.

FIG. 15 illustrates 2D image 1502 and virtual environment 1504, as such objects might appear on display 210 of local computing device 102. For example, corner cabinet 1506 from 2D image 1502 may be the starting element for cabinet set 1508.

At block 308 of FIG. 3, the location of the starting element may be identified in the virtual environment. The corner cabinet 1506 from 2D image 1502 may be placed at location 1510 in virtual environment 1504.

At block 310 of FIG. 3, the 3D model of corner cabinet 1506 may be placed at location 1510 in virtual environment 1504. Cabinet set 1508 may comprise one or more, or multiple, products, one or more, or each, of which may be stored as 3D model data in local resource database 106 and/or master resource database 122 and rendered thereto as the 3D model. For example, after the 3D model of corner cabinet 1506 is placed at location 1510 in virtual environment 1504, among other scenarios, the 3D model data of the other products that comprise cabinet set 1508 may be retrieved (e.g., automatically) from local resource database 106 and/or master resource database 122, rendered, and/or placed in virtual environment 1504, as described at blocks 312, 314, and 316 of FIG. 3.

In some examples, a virtual tether may determine one or more digital objects from the master resource database 122 and may superimpose these objects in virtual environment 1504. The objects may be rendered by rendering engine 112. For example, during the rendering process, the object may be received from local resource database 106 (e.g., as the wireframe object, dimensions, etc.). Rendering engine 112 may align the objects relative to the wall plane of virtual environment 1504 and/or adjust the height of one or more of the digital objects relative to the ground plane. In some examples, rendering engine 112 may adjust the objects to an appropriate perspective such that the computer-generated content is able to appear at roughly an identical scale and/or proportion to real objects present within the image. The material may be added to the wireframe object by rendering engine 112 and displayed in the proper perspective in relation to (at least) the wall plan and ground plane.

In some examples, the objects may be placed in accordance with an inspirational image stored in master layout database 124. The selected objects may be grouped in master layout database 124 and placed in accordance with one or more rules for placement of the object in the virtual environment. This approach supports element placement with a specific layout maintained between the layout depicted in the 2D image and the virtual environment.

In some examples, one or more objects in a 2D image can be placed or moved together in the virtual environment. The objects may be tethered and movable as a grouped, virtual unit. The spatial relationships may be maintained as the objects are moved in the virtual environment.

Placement module 114 may use the image metadata to identify the appropriate 3D placement of single or multiple objects from an input 2D image. The algorithm considers an object's relative position to all the adjacent objects and surfaces to place the object represented in the 2D image at an appropriate location in virtual environment. As an illustrative example, an object that needs to rest on a surface (e.g., a lamp on a table or floor, etc.) cannot be placed on a ceiling. The metadata may identify that the object is limited to surface placements in the virtual environment.

At block 318 of FIG. 3, the technique may terminate or continue as more products from the 2D image may or might not be selected for addition to the virtual environment.

Figure 16:
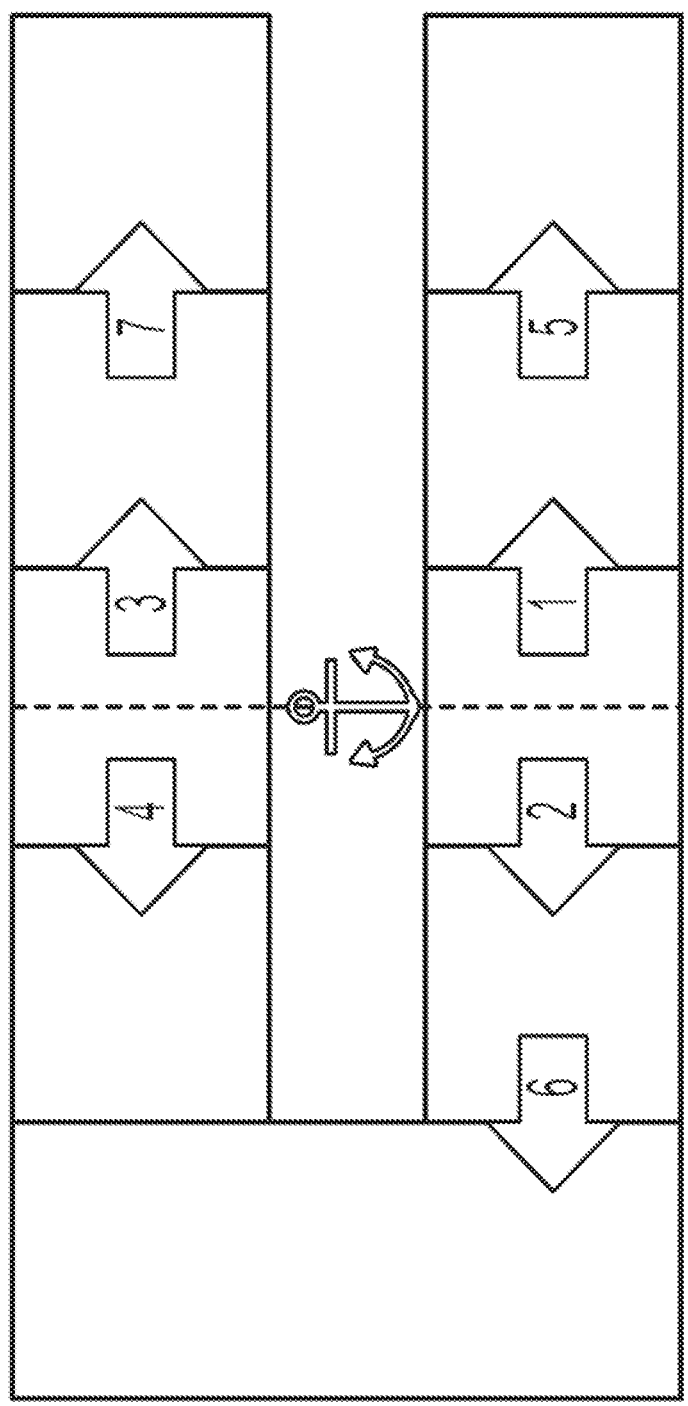
FIG. 16 shows an example technology for the 3D placement of 3D models based on a 2D image according to the present disclosure.

FIG. 16 shows an example diagram illustrating how 3D models may be (e.g., automatically) placed in one or more virtual environments, for example, by virtue of adjacency to an mounting point and/or to a previously placed 3D model. A 3D model's relative position to one or more, or all, the adjacent 3D models and/or surfaces may be used to place the 3D model represented in the 2D image at an (e.g., appropriate) location in the one or more virtual environments. One or more entry points and/or mounting points may be found from the 3D models to be placed in one or more virtual environments. For example, if the 3D models chosen from the 2D layout do not include a specified mounting, among other scenarios, then placement may proceed from left to right through the 3D models chosen.

In some examples, an input may be useful (e.g., required) to start the placement based on the starting 3D model. For example, after a starting point is determined, among other scenarios, one or more, or all, the 3D models may be placed using one or more virtual placement methods. A placement may follow an available path of unvisited 3D models, for example, until it reaches a dead-end. In one or more scenarios, one or more new (e.g., fresh and/or previously unused) paths of unvisited 3D models may be started.

The input may be stored in a user profile and/or be client-specific. For example, a user may provide input to identify the starting placement for a virtual environment. The starting placement may be stored in the user profile so that a second time that the virtual environment is activated, the input may be retrieved from the user profile rather than new input from the user. In some examples, the user profile may also store information for filtering, sorting, style or color preferences, names, descriptions, sort order weight, and the like.

In some examples, this may be repeated, for example, until one or more, or all, paths are visited. For example, if the 3D models picked from the layout may include one or more, or multiple, mountings and/or gaps between 3D models that are on different surfaces, among other scenarios, then another input may be useful (e.g., required) to pick at least one 3D position to establish one or more new (e.g., fresh and/or previously unused) starting points.

In some examples, the starting location for (e.g., automatic) placement of 3D models might not utilize user input. In one or more scenarios, the starting location for (e.g., automatic) placement of 3D models may be chosen by one or more placement algorithms, for example, using information about the dimensions of the walls, floors, and/or ceilings of the virtual environment, and/or locations of existing 3D models previously placed within the virtual environment, among others. In one or more scenarios, the placement method may determine if already placed 3D models may (e.g., should) be moved, for example, in order to accommodate further (e.g., automatic) placement of one or more additional 3D models.

In some examples, the placement may be based on a photograph, absent any input from the user to start placement of the objects. For example, the system may identify one or more of the 3D models that correspond with objects visible in the photograph. Once the objects are identified and/or correlated with metadata of 3D models (e.g., stored as 3D model data), the system may determine usable space in the virtual environment. The one or more 3D models may be placed in accordance with rules discussed throughout the disclosure (e.g., starting with the largest object, starting with a corner, starting with an mounting point, placing objects in accordance with a workable triangle, etc.).

In some examples, the placement method(s) may (e.g., iteratively) modify placement(s), for example, in order to establish the (e.g., most optimal) locations for one or more, or all, (e.g., automatically) placed 3D models in accordance with one or more arrangement/decor style rules. In one or more scenarios, the (e.g., automatic) placement of 3D models may identify the usefulness (e.g., requirement) of one or more additional 3D models that may fit into the (e.g., optimal) space. For example, 3D models for cabinets may be (e.g., automatically) placed along a wall to fit from one corner to another corner. The wall-length may be such that a gap may be present between the ending wall and the ending cabinet. The (e.g., automatic) placement may identify within local resource database 106 and/or master resource database 122 one or more additional fill models which, when placed accordingly, may close the gap. In some examples, a spacer is used to fill in the gap without adding additional storage space in the virtual environment. In one or more scenarios, the (e.g., automatic) placement may identify when (e.g., automatically) placed products may conflict with one or more (e.g., predetermined) layout rules and/or regulations. For example, the (e.g., automatic) placement of cabinets along a wall may identify if cabinets were too close to a stove hood, perhaps causing a violation of fire code(s).

In some examples, the one or more 3D models may correspond with 3D model data that includes mounting data and/or one or more mounting points that may define one or more 3D locations and/or bounds of the 3D model, which may be used as reference points for subsequent models against which to be placed. In one or more scenarios, the mounting data might not be directly associated with the 3D model and/or may be computed at runtime, for example, based on the extents of the 3D model geometry, the type of object the 3D geometry represents, such as a table or a lamp, and/or one or more rules associating types of geometry to the generation of one or more mounting points.

In some examples, a 3D model of a table may be processed at runtime and/or the extents of the geometry may be used to create 3D mounting points at the top corners of the tabletop. One or more rules associated with table geometry may be invoked causing an additional mounting point to be created at the center of the tabletop, for example, at the geometric center of the four corners of the tabletop. In one or more scenarios, the 3D mounting points may contain data describing the types of 3D model geometry to which they may be used for placement. For example, one or more mounting points created on a tabletop may be created with data indicating that the one or more mounting points may be used for placement of table lamps.

In some examples, the placement algorithm(s), as they may proceed through (e.g., automatic) placement, may consider the unused mounting points and/or associated mounting data within the virtual environment, for example, in order to determine viable locations for placing the remaining 3D model data, among other reasons. In one or more scenarios, the 3D mounting points may be replaced by 3D planes that may describe a geometric surface of a 3D model. For example, a mounting plane for a tabletop may be defined using the surface normal of the tabletop and/or the extents of the tabletop geometry. In one or more scenarios, the placement algorithm(s) may consider the mounting planes and/or associated mounting data within the virtual environment, for example, in order to determine one or more viable locations for placing the remaining 3D models.

In some examples, the placement algorithm(s) may identify one or more, or multiple, mounting points and/or mounting planes, may prioritize which mounting point(s) and/or plane(s) that may be based on one or more aesthetic rules associated with the 2D image 402, and/or provided from another source. In one or more scenarios, one or more aesthetic rules may provide hierarchical information specifying precedence of characteristics. For example, one or more aesthetic rules may specify mounting points furthest from windows may be a higher priority for placing table lamps than mounting surfaces closest to windows. The placement algorithm(s) may use one or more aesthetic rules to filter the viable mounting points and/or planes within the virtual environment, for example, until a suitable (e.g., most relevant) mounting location is identified.

Other placement algorithm(s) are available as well. For example, an entry point or mounting point may be found from the elements to be placed in the virtual environment. If the elements chosen from the layout do not include a specified mounting, then placement proceeds from left to right through the elements chosen. User input may be received (e.g., required) to start the placement based on the starting element calculated. Once a starting point is determined, the placement algorithm may spread through all the elements to place using a viral placement method. The placement may follow an available path of unvisited elements until it reaches a dead-end, then starts a new path of unvisited elements, repeating this until all paths are visited.

In some examples, one or more elements selected from the layout may include multiple mounting points or gaps between elements that are on different surfaces. In that case, another input may be requested and received from the user to select a 3D position to establish a new starting point in the virtual environment.

In some examples, the data are user-specific. For example, data about the entire layout may include client-specific data for filtering and sorting, style/color information, a name, a description, and a sort order weight.

In some examples, the design element data includes specific data relating to a single element in the layout. The data may be stored in the master resource database 122. The data may include, for example, a product identifier of the product that represents that element in 3D, an abstracted surface the element is on, which depth layer the object is on, a horizontal order, a vertical order, any rotation offsets, any height offset, a focal group, and which direction the object should face.

In some examples, the placement process is designed to facilitate the easy placement of complex arrangements of objects in a virtual environment by simply selecting elements in a layout or series of layouts and then selecting where in the virtual environment the elements should be placed starting with a mounting point. In a kitchen application an mounting could be a sink, oven, and hood, or a refrigerator. A coffee table or large couch might also be mounting points for a layout of furniture. This solution allows for many elements from a single layout to be placed into a complex 3D arrangement with minimal outside input once elements are selected from the layout. Using this approach, elements can be chosen out of multiple layouts and combined to create a unique 3D arrangement, merging favorite elements of each layout.

As illustrated, an mounting point may be determined from the object to be placed in the space. If the objects chosen from the layout do not include a specified mounting, the placement process proceeds from left to right through the objects chosen. Input may be requested to start the placement based on the starting element calculated. Once a starting point is determined, the placement process spreads through all the objects to place using a viral placement method. It follows an available path of unvisited elements until it reaches a dead-end, then starts a new path of unvisited elements, repeating this until all paths are visited.

In some examples, multiple mountings may be determined. For example, suppose the objects picked from the layout include multiple mountings or gaps between objects that are on different surfaces. In that case, another input is received to pick a 3D position to establish new starting points.

Figure 17:
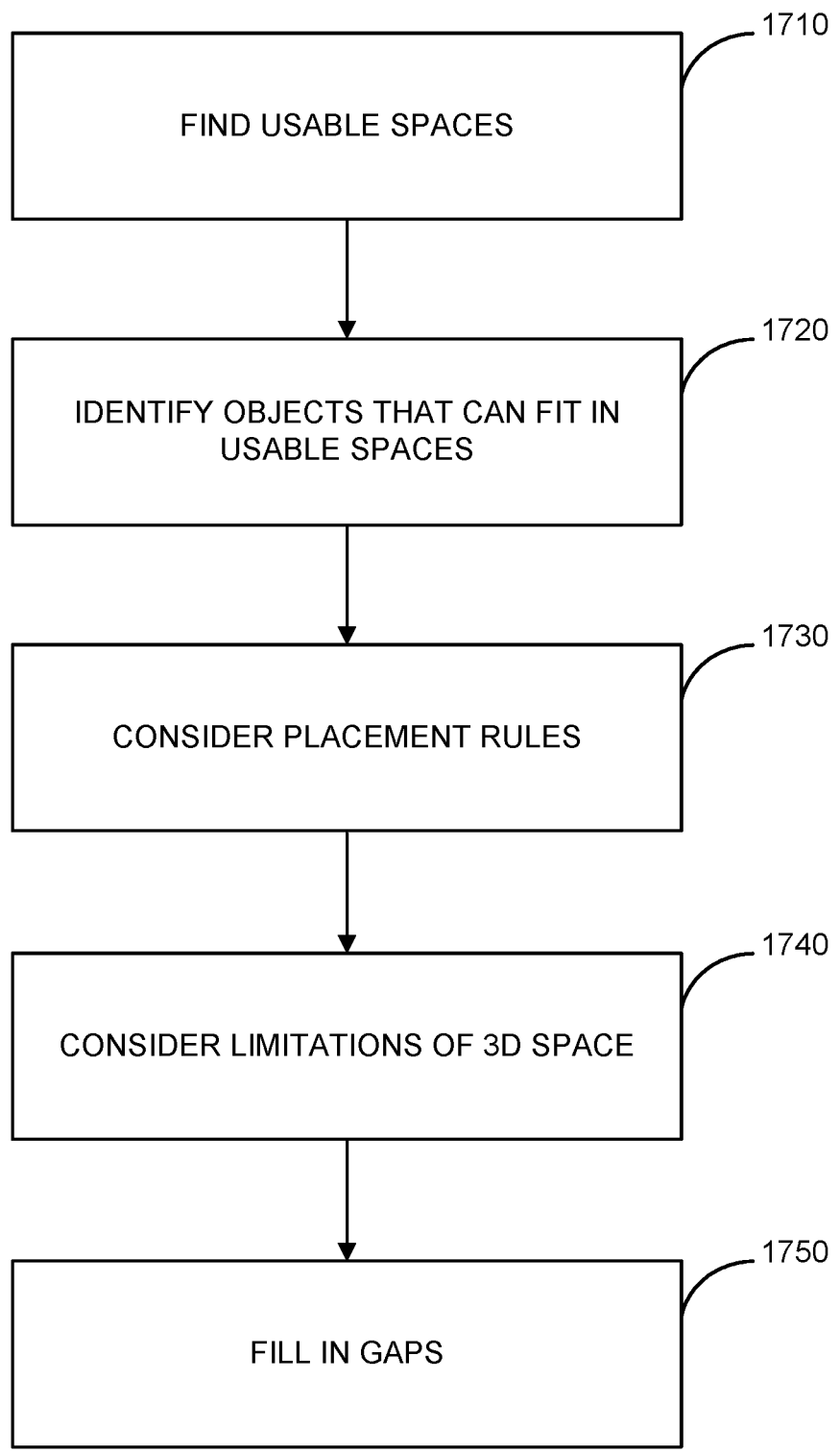
FIG. 17 illustrates a process of placing 3D models in the virtual environment, in accordance with the embodiments disclosed herein.

FIG. 17 illustrates a process of placing 3D models in the virtual environment. The process may be implemented by local computing device 102.

At block 1710, the process may find usable spaces in the virtual environment. For example, the process may identify walls, windows, doors, or other stationary objects that have been incorporated with the virtual environment. Measurements of the remaining spaces in the virtual environment may be determined as usable spaces to place 3D objects. In some examples, the 3D objects may correspond with inspirational design elements depicted in a photograph.

At block 1720, the process may identify objects that can fit in the usable spaces. For example, a subset of 3D model data may be stored in a computer memory (e.g., local resource database 106 or master resource database 122) as corresponding with objects that can fit in a usable space of a virtual environment. This can be illustrated as a ten-foot wide cabinet being unavailable to fit on a four-foot wide wall of the virtual environment and/or four-feet of remaining usable space.

At block 1730, the process may consider placement rules of the 3D models. For example, the photograph may help determine placement rules based on the original design intent of the room (e.g., corresponding with a shared parameter or tag, classified as related to a design intent), but adjust the layout for different size and shape rooms. In another example, the objects may be placed starting with an mounting point and added around the mounting point.

At block 1740, the process may consider limitations of the virtual environment. For example, the corners, doorways, and windows of the virtual environment may be determined and identified as non-usable space. Objects may be removed from these limitations located around the environment.

At block 1750, the process may fill in the gaps in the virtual environment between the placed objects. For example, if the cabinets do not fill a full wall of the environment, a spacer that corresponds with the additional space or gap in the environment may be identified from the master resource database 122 or local resource database 106. The spacer may be used to fill in the gap without adding additional storage space in the virtual environment.

Figure 18:
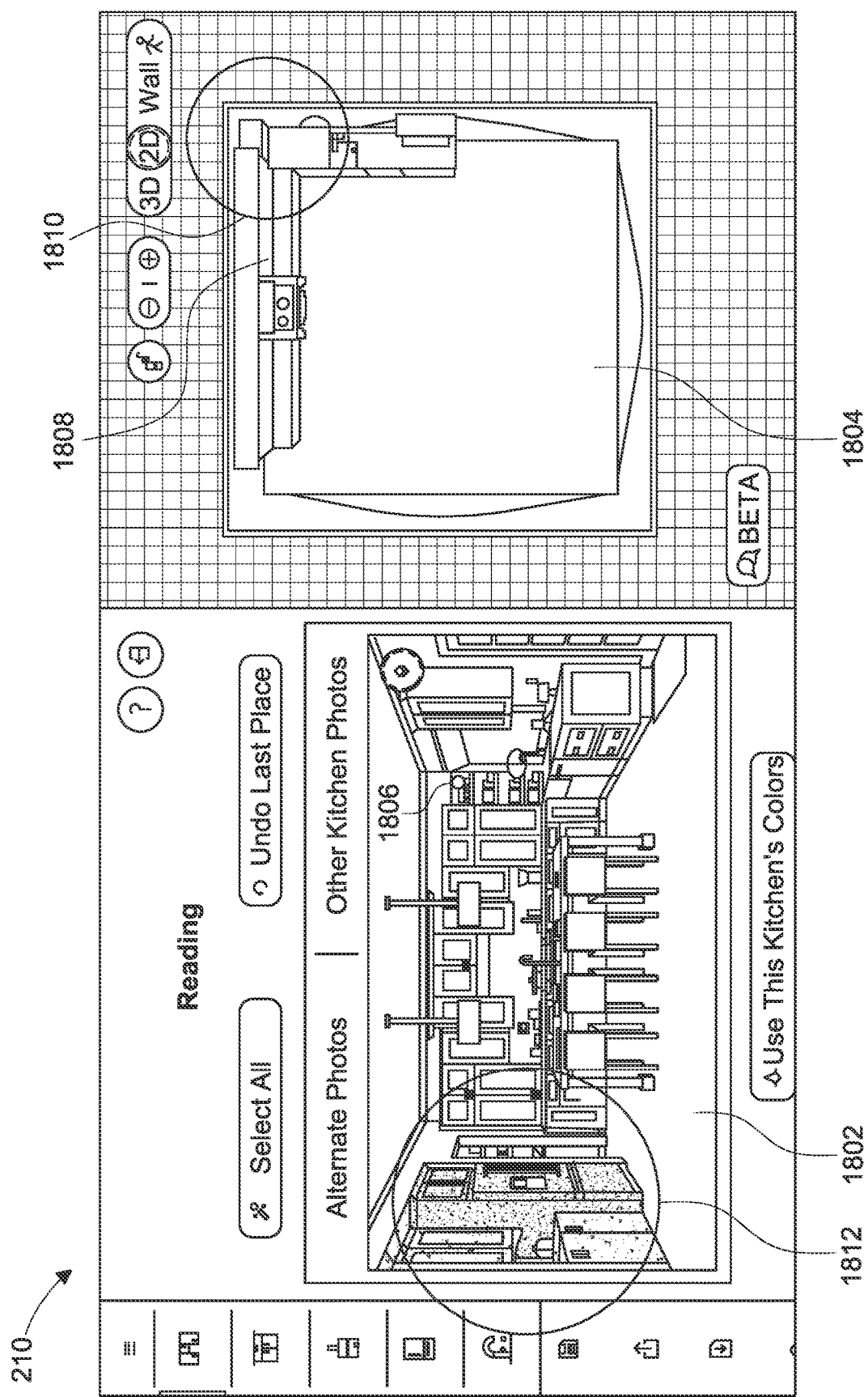
FIG. 18 shows an example technology for the 3D placement of 3D models based on a 2D image according to the present disclosure.

FIG. 18 illustrates 2D image 1802 and virtual environment 1804, as such objects might appear on display 210 of local computing device 102. One or more 3D models of the entire cabinet set 1808 may be placed into virtual environment 1804, for example, based on location 1810 that may have been selected for the mounting point, corner cabinet 1806. Refrigerator 1812 may be selected as the next starting element to be placed into virtual environment 1804.

Figure 19:
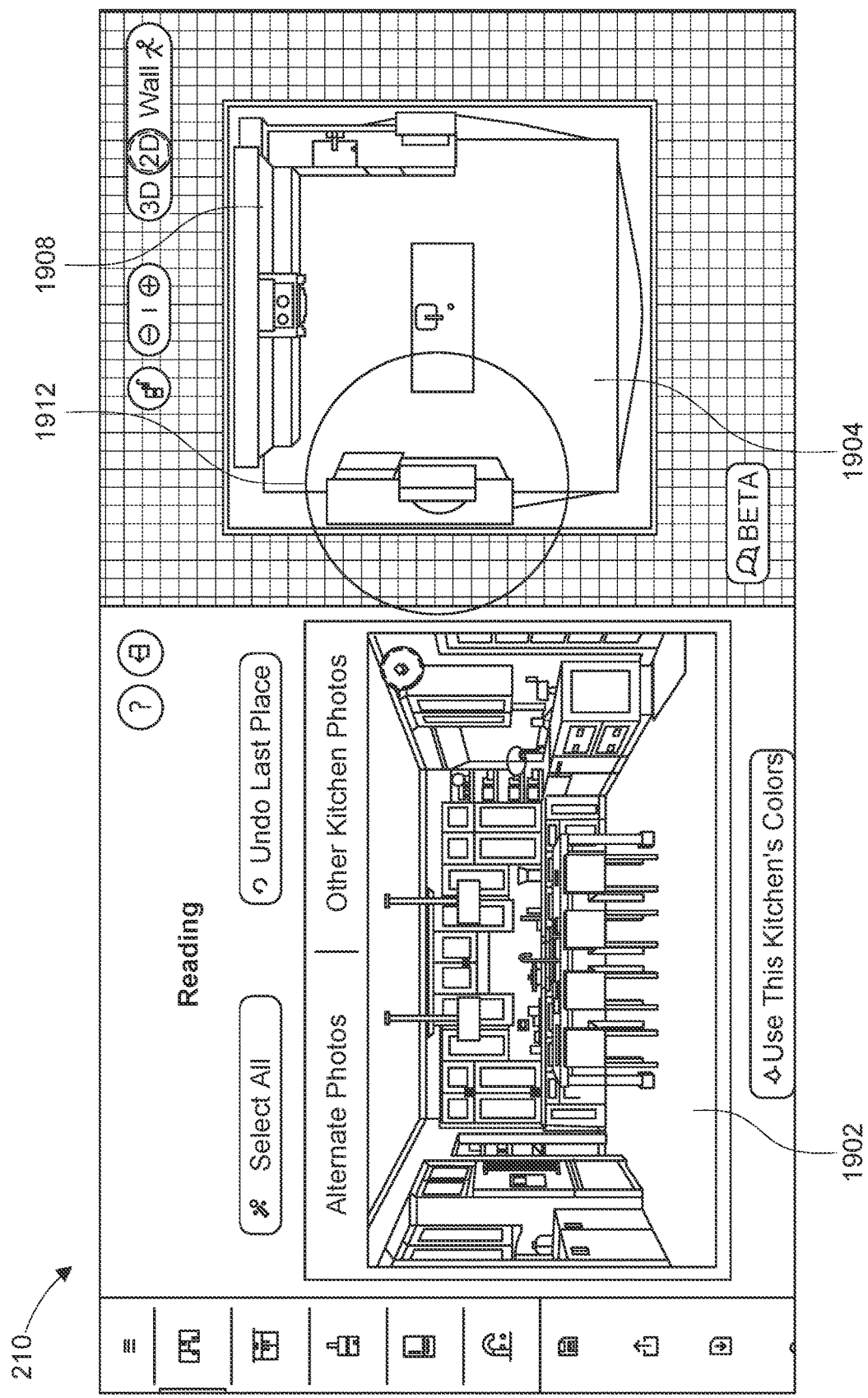
FIG. 19 shows an example technology for 3D placement of 3D models based on a 2D image according to the present disclosure.

FIG. 19 illustrates 2D image 402 and virtual environment 1904, as such objects might appear on display 210 of local computing device 102. 3D models of refrigerator 1912 and its associated products may be placed into virtual environment 1904, based on the location that was selected for the mounting point, refrigerator 1912. Refrigerator 1912 may be selected as the next mounting object to be placed into virtual environment 1904.

Figure 20:
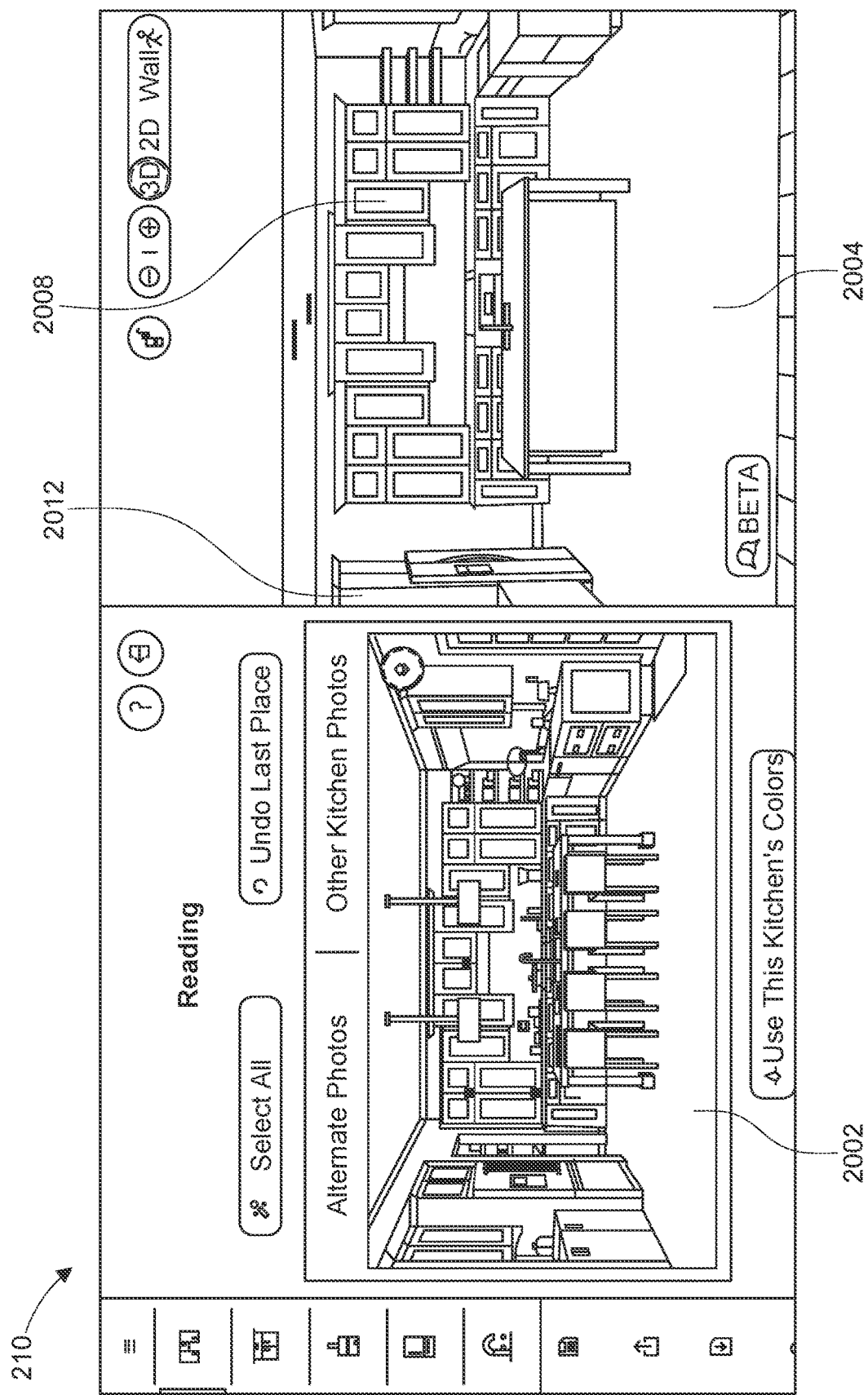
FIG. 20 shows an example technology for 3D placement of 3D models based on a 2D image according to the present disclosure.

FIG. 20 illustrates 2D image 2002 and virtual environment 2004, as such objects might appear on display 210 of local computing device 102. virtual environment 2004 may be finalized. The composition of the virtual environment and/or the addition of 3D models may be done iteratively. For example, a preliminary virtual environment may be composed, and then after 3D models are added the virtual environment may be modified. Virtual objects may be added to or subtracted from the modified virtual environment, and then may be modified again. The process can be repeated over and over.

The systems and methods described in the present disclosure are designed to facilitate the easy placement of complex arrangements of objects in a virtual environment by simply selecting 3D models in a layout or series of layouts and then selecting where in the virtual environment the 3D models should be placed starting with an mounting point. In a kitchen application an mounting could be a sink, oven, hood, or a refrigerator. A coffee table or large couch might also be mounting points for a layout of furniture. This solution allows for many 3D models from a single layout to be placed into a complex 3D arrangement with minimal outside input once 3D models are selected from the layout. Using this approach, 3D models can be chosen out of one or more, or multiple, layouts and combined to create a unique 3D arrangement, merging favorite 3D models of each layout.

In some examples, system 100 may be configured to determine the resolution, and/or the file size, of 3D models on an object-specific and/or platform-specific basis. For instance, system 100 may be configured to asynchronously and/or automatically generate different resolutions and/or compression formats for one or more, or all, supported operating systems and/or hardware devices. Object and platform combinations with a specific resolution of a 3D model that may be used are identified by system 100. System 100 also can identify which objects in a room type or application should be featured and therefore have higher resolution.

In some examples, system 100 may be configured to recognize device capacity (for example, local computing device 102) and may adapt accordingly. For example, for a device and/or a virtual reality setting, system 100 may have a certain maximum capacity value for 3D model data memory, for example, because of how many 3D models may be placed in the virtual reality setting and/or rendering capacity of the device. Remote computing device 118 can access the mobile device's capacity. Remote computing device 118 may adjust the texture resolution, for example, based upon the capability of the mobile device and transmit the 3D model data to the mobile device that includes the adjusted texture resolution or other values. System 100 can be configured to allocate more memory for (e.g., important) objects. The memory and/or the resolution may vary, for example, depending on the distance of the user's perspective from the objects in view.

In some examples, system 100 may be configured to interface with commerce systems and/or inventory management systems. Commerce systems and/or inventory management systems may define objects as "models" with "options." For instance, a rug might come in three sizes and three colors. In commerce systems and/or inventory management systems, there may be a model ID and/or object ID for the rug itself and/or a SKU for one or more, or each, variation of size and/or color. In one or more scenarios, the model ID and/or object ID alone might be insufficient to provide the user with a rendering of one or more, or all, options of the object. In one or more scenarios, system 100 may configured to resolve one or more, or all, possible SKU options, and/or to render 3D models of one or more, or each, object, for example, using one or more, or each, possible variation. In one or more scenarios, system 100 may generate one or more 3D models using 3D model data in relation to one or more, or each, SKU option, and/or may understand the relationship of the model ID and/or object ID to the SKU.

In some examples, system 100 may be configured to use procedural modeling. For example, system 100 may be configured for cabinet doors by defining a 2D profile of the door and the rules for how to offset door and drawer style profiles from the face of a cabinet. System 100 may be configured to dynamically "stretch" the door parameters to fit one door to any cabinet size, instead of modeling every door shape and size. For example, system 100 can be configured to do this for crown molding, shoe molding, countertops, counter-top edge profiles, baseboards, ceiling structures, showers, and/or ceiling lights, etc.

In some examples, system 100 may be configured to render "assemblies," which may correspond with objects mounted on other objects and/or arranged into some kind of layout. For example, cabinets in a kitchen, a faucet on a vanity, and/or a lamp on a table are examples of assemblies. System 100 can be configured with the ability to pre-assemble objects into compound objects and/or assemblies, and/or apply a specific price to the compound object and/or assembly. System 100 can be configured with the ability to mount an object on another object using one or more rules and/or metadata that may define fit, location, and/or compatibility. System 100 can be configured such that assemblies can also be editable or not editable.

In some examples, system 100 may be configured with one or more business rules for objects and/or assemblies that may define what object and/or assembly can physically fit, where the object and/or assembly may fit, how the object and/or assembly may be oriented, and/or whether the object and/or assembly can be changed. For example, system 100 may be configured with an "object class" concept to define compatibility/fit between objects. For example, a 3-hole faucet fits only on a 3-hole vanity, or a sofa must rest on a floor, or a dishwasher must be against a wall and under a countertop.

In another example, if a user attempts to place two 3D models in the same virtual environment, system 100 may be configured to determine the compatibility/fit between such objects and arrange them accordingly. For example, if a user attempts to place a virtual end table and a virtual lamp in the same virtual location, system 100 may be configured to arrange the virtual end table on the floor of the virtual environment, and the virtual lamp on top of the virtual end table. For example, system 100 may be configured to allow for various levels of specificity to determine fit. Sometimes there may be (e.g., may only be) one specific object that can fit on another specific object. Other times there may be a larger set of objects that can fit together.

In addition to physical compatibility, for example, system 100 may be configured to allow for merchandising rules that allow the content managers to say which categories or other object attributes are allowed to fit in a location. For example, system 100 may be configured to such that the user can put any 3-hole faucet on this 3-hole vanity (using object class), but only Kohler® faucets are allowed if the users want a specific price over a Labor Day Sale (using object manufacturer).

In some examples, system 100 may be configured with one or more composition properties that may define how an object can be composed in a scene. For example, regarding refrigerators, system 100 may be configured to require that refrigerators have to be mounted on a floor and against a wall, that the refrigerators cannot be rotated, and/or that refrigerator doors can be rotated, but perhaps only about a specific mounting point and/or within a specific arc.

In some examples, system 100 may be configured with one or more composition properties that may allow animations of objects for manipulating one or more object parts, for example, to show the object inside and/or some range of motion. For example, regarding refrigerators, system 100 may be configured to allow animation to be data-driven and/or assigned for class(es) and/or objects, for example, assigned to one or more, or each, (e.g., specific) 3D model. System 100 can be configured to allow objects to make sounds, and/or for lighting (e.g., lights, lamps, and/or ceiling fans) to have properties that may allow control of angle, spread, and/or intensity.

Augmented reality may be incorporated to blend a user's environment with digital information (e.g., the 3D model data), generally in real time. In other words, the digital information may be embedded, or overlay to, the actual environment. Typically, image recognition software analyzes environment information as detected from one or more images of the environment, as well as a location of the computing device that captured the image relative to the environment at the time at which the respective images were taken and renders realistic 3D models in the environment. Because it can be difficult to anticipate the movement of the computing device relative to the environment in advance, among other reasons, the 3D models may be rendered in real-time.

Elements/components of system 100 disclosed herein may be adapted for augmented reality.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

Figure 21:
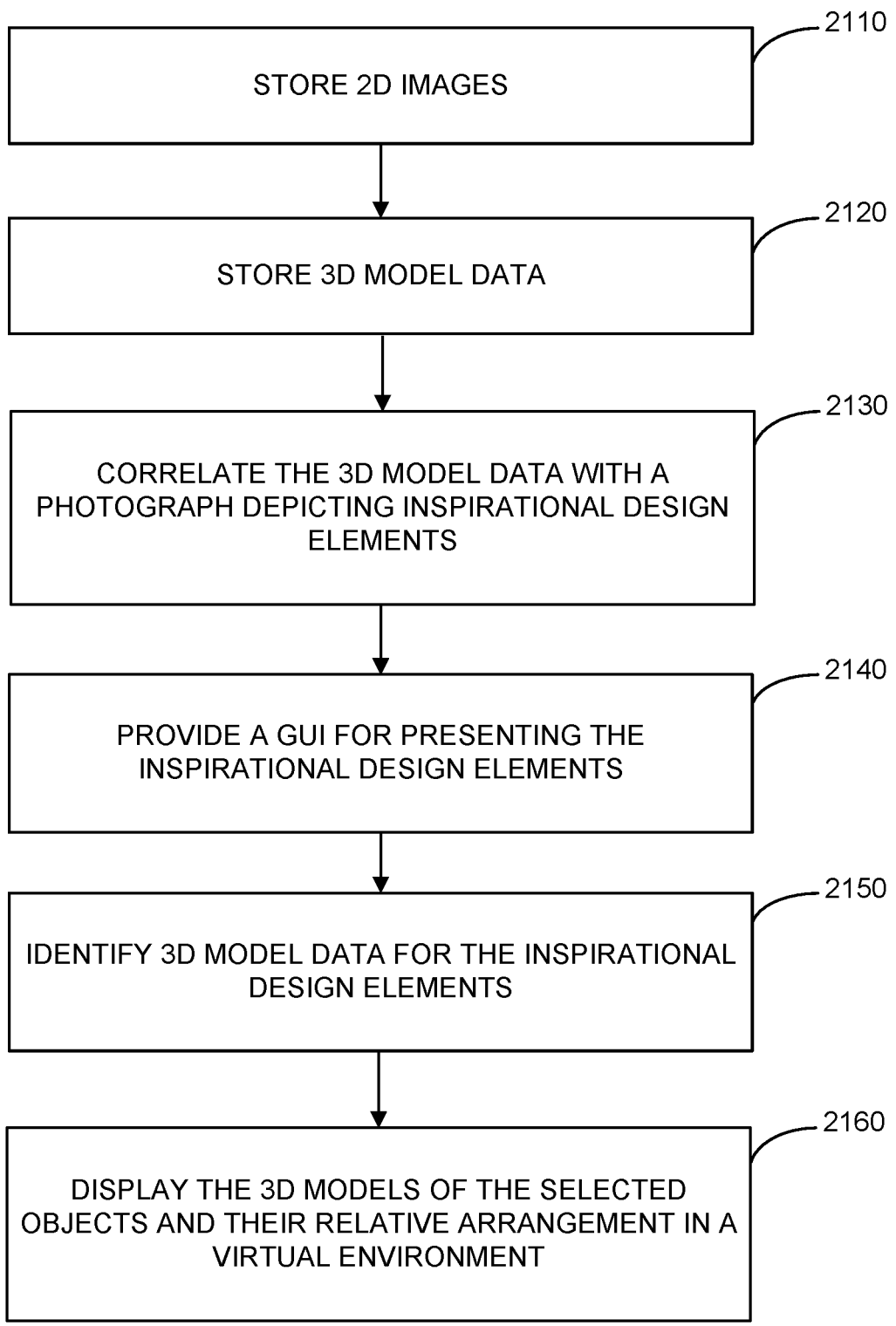
FIG. 21 illustrates a process of placing 3D models in a virtual environment, in accordance with the embodiments disclosed herein.

FIG. 21 illustrates a process of placing 3D models in a virtual environment, in accordance with the embodiments disclosed herein. The process may be implemented by local computing device 102.

At block 2110, the process may store a set of 2D images. The stored 2D images may include a visual representations of rooms depicted in an image, including objects in the room, layouts of the objects and/or other information. The object information may include a product identifier or SKU, available style or finish information from a particular manufacturer (e.g., cover SKU for customizable sofa), dimension information, product attributes, product purchase information (e.g., where it is available for purchase), and/or other product information. The layout may include the location of the objects within the room and the relative location of the objects with respect to one another. Image metadata information stored in association with the 2D image may include information about objects in the image, layout information of the objects in the image, attribute information about the image, including for example, a category type of the room or other space depicted in the room (e.g., dining room, living room of other room category), decor style information (e.g., modern, contemporary, transitional, or other décor style information) and/or other image information. The set of 2D images can depict different layouts of objects (e.g., furniture or other objects in a 2D photograph), where the determination is based at least in part to physical attributes of the corresponding objects, the size, shape and/or other parameters of the room in the 2D image and the size, shape and/or other parameters of the virtual environment. In some examples, the set of 2D images of layouts of the arrangement of objects in the room may be stored in a computer memory.

At block 2120, the process may store 3D model data for the objects. 3D model data may comprise various information about a 3D model that is stored in a database. For example, the stored 3D model data may include a wire frame for an object and skin or physical attributes for the object, including for example color, texture, material, default dimensions of the object, lighting, depth, and/or other physical attributes. 3D model data may include information relating to the 3D model's relationships to other 3D models including depth layer, horizontal order, vertical order, rotation offset, height offset, focal group, facing direction, and/or other model information. In some examples, 3D model data may store relative position information regarding the placement of the 3D model in relation to other 3D models, as the set of 3D models are rendered and placed in the virtual environment.

At block 2130, the process maps objects on an image with 3D model data. The process determines the object and physical attributes in the image, then maps the object to the relevant stored model data including the corresponding wireframe, skin and/or other info. For example, a preprocessing module of the system may process the stored 2D images to create and store the image information, identify objects, physical attributes of the objects and a layout of the objects in the 2D image, map identified objects to stored 3D model data, and store the mapping in one or more storage devices. Additionally, this generates information used by the placement rules and rendering rules.

At block 2140, the process may provide a graphical user interface for presenting the 2D images for the user to select from the set of 2D images of layouts. Various user interface tools may be provided for a user to scroll through and/or search images. For example, the system may provide a 3D room designer application configured to create a virtual environment that presents the 2D images for selection by the user. Based on a selected 2D image, the application may determine products depicted in the image and each product's corresponding object mapped to 3D model data stored in the database. The 2D image may correspond with image metadata, including a category type of the room or other space depicted in the room, décor style information and/or other image information discussed herein.

The system may apply the placement rules stored with the 3D model data for each object to determine the locations in the virtual environment at which the 3D models of the objects should be placed, retrieve the 3D model data mapped to the object, generate a 3D model for each of the objects via the rendering engine, and render the 3D models at the locations determined by the placement rules in the virtual environment.

In some examples, the virtual environment is automatically generated using the 2D image and in other instances, the virtual environment is generated using specified parameters received from the user. For example, the parameters of the virtual environment may include for example, one or more of the size of the space, a space configuration (e.g., orientation and size of one or more walls, a ceiling and/or other space configuration parameters), structural features (e.g., size and location of windows, doors, sinks, appliances and/or other structural features) and/or other specified parameters. Additional user interface elements of the 3D room designer application enable the user to manipulate the 3D models displayed in the virtual environment once they are placed, including adding or deleting 3D models from the virtual environment, moving the location of 3D models within the virtual environment and/or relative to other 3D models, and changing the attributes of the objects corresponding to the 3D models (e.g., color, texture, size or other attributes). The 3D room designer application can generate a new rendering based on these and/or other selections by a user.

At block 2150, the process may identify the 3D model data for the objects in the 2D image. In some examples, identifying the 3D model data may be performed in response to receiving the user selection of the 2D image or may be previously determined when the 2D image is stored with the system. For example, a preprocessing module may process the 2D images that are stored or to be stored in the system. The preprocessing module may process the 2D images to create and store the image information, identify objects, physical attributes of the objects and a layout of the objects in the selected image, map identified objects to stored 3D model data, and store the mapping in one or more storage devices. This preprocessing of images enables the system to automatically generate 3D models of the objects of the images upon selection of an image. Additionally, this generates information used by the placement rules and rendering rules.

At block 2160, the process may display the rendered 3D models of the selected objects and their relative arrangement in the virtual environment. For example, the 3D room designer application is configured to retrieve the 3D model data mapped to the object, generate a 3D model for each of the objects, and render the 3D models at the locations determined by the placement rules in the virtual environment. The placement rules may comprise algorithmically determining the arrangement of the 3D models in the virtual environment.

Figure 22:
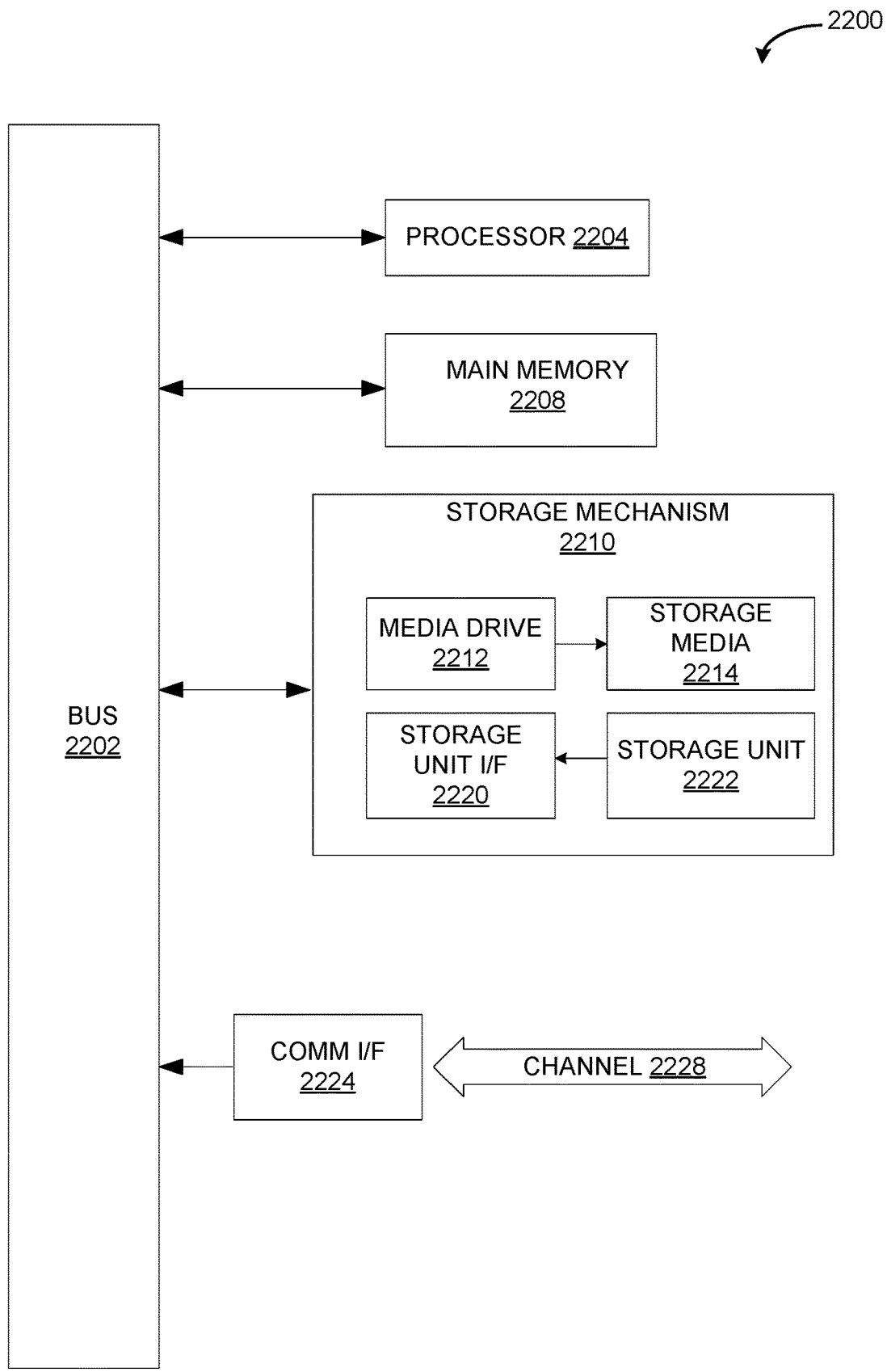
FIG. 22 shows an illustrative computing system for implementing the embodiments disclosed herein.

Additional user interface elements of the 3D room designer application enable the user to manipulate the 3D models displayed in the virtual environment once they are placed, including adding or deleting 3D models from the virtual environment, moving the location of 3D models within the virtual environment and/or relative to other 3D models, and changing the attributes of the objects corresponding to the 3D models (e.g., color, texture, size or other attributes). The 3D room designer application can generate a new rendering based on these and/or other selections by a user.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 22. Various embodiments are described in terms of this example logical circuit 2200. After reading this description, it will become apparent to a person skilled in the relevant art how to implement the technology using other logical circuits or architectures.

Referring now to FIG. 22, computing system 2200 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 2200 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 2200 might include, for example, one or more processors, controllers, control engines, or other processing devices, such as a processor 2204. Processor 2204 might be implemented using a general-purpose or special-purpose processing engine such as, for example, a microprocessor, controller, or other control logic. In the illustrated example, processor 2204 is connected to a bus 2202, although any communication medium can be used to facilitate interaction with other components of logical circuit 2200 or to communicate externally.

Computing system 2200 might also include one or more memory engines, simply referred to herein as main memory 2208. For example, preferably random-access memory (RAM) or other dynamic memory, might be used for storing information and instructions to be executed by processor 2204. Main memory 2208 might also be used for storing temporary variables or other intermediate information during execution of instructions to be executed by processor 2204. Logical circuit 2200 might likewise include a read only memory ("ROM") or other static storage device coupled to bus 2202 for storing static information and instructions for processor 2204.

The computing system 2200 might also include one or more various forms of information storage mechanism 2210, which might include, for example, a media drive 2212 and a storage unit interface 2220. The media drive 2212 might include a drive or other mechanism to support fixed or removable storage media 2214. For example, a hard disk drive, a floppy disk drive, a magnetic tape drive, an optical disk drive, a CD or DVD drive (R or RW), or other removable or fixed media drive might be provided. Accordingly, storage media 2214 might include, for example, a hard disk, a floppy disk, magnetic tape, cartridge, optical disk, a CD or DVD, or other fixed or removable medium that is read by, written to, or accessed by media drive 2212. As these examples illustrate, the storage media 2214 can include a computer usable storage medium having stored therein computer software or data.

In alternative embodiments, information storage mechanism 2240 might include other similar instrumentalities for allowing computer programs or other instructions or data to be loaded into logical circuit 2200. Such instrumentalities might include, for example, a fixed or removable storage unit 2222 and an interface 2220. Examples of such storage units 2222 and interfaces 2220 can include a program cartridge and cartridge interface, a removable memory (for example, a flash memory or other removable memory engine) and memory slot, a PCMCIA slot and card, and other fixed or removable storage units 2222 and interfaces 2220 that allow software and data to be transferred from the storage unit 2222 to logical circuit 2200.

Logical circuit 2200 might also include a communications interface 2224. Communications interface 2224 might be used to allow software and data to be transferred between logical circuit 2200 and external devices. Examples of communications interface 2224 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2224 might typically be carried on signals, which can be electronic, electromagnetic (which includes optical) or other signals capable of being exchanged by a given communications interface 2224. These signals might be provided to communications interface 2224 via a channel 2228. This channel 2228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2208, storage unit 2220, media 2214, and channel 2228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 2200 to perform features or functions of the disclosed technology as discussed herein.

Although FIG. 22 depicts a computer network, it is understood that the disclosure is not limited to operation with a computer network, but rather, the disclosure may be practiced in any suitable electronic device. Accordingly, the computer network depicted in FIG. 22 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for composing a virtual environment representing a room or other space having specified parameters, facilitating placement of 3D models of objects in the virtual environment, where the 3D models correspond to one or more objects depicted in a 2D image, and the placement of the 3D models is algorithmically determined based on placement rules to generate an arrangement of the 3D models based on a layout of the one or more objects in the 2D image, the computer-implemented method comprising:
   storing, in a computer memory, a set of 2D images;
   storing, in a computer memory, 3D model data including wireframes for rendering 3D models that correspond to objects and physical attributes of the objects;
   preprocessing the set of 2D images to identify objects, physical attributes of the objects and layouts of the objects in individual ones of the selected images and mapping the objects to stored 3D model data;
   storing, in a computer memory, a set of placement rules;
   receiving a user selection of one 2D image of the set of 2D images; and
   using a processor, encoded with computer instructions, which when executed, cause the processor to perform steps of:
   executing the placement rules to algorithmically determine placement locations of the 3D models corresponding to objects depicted in the selected 2D image, wherein the placement locations of the 3D models includes placement of at least one 3D model in relation to a mounting point in the room or other space, wherein the placement of the at least one 3D model maintains a walking space in the virtual environment, and wherein executing the placement rules algorithmically determines the placement of other 3D models corresponding to objects depicted in the selected 2D image;
   generating 3D models corresponding to the objects depicted in the selected 2D image based at least in part on the 3D model data mapped to at least some of the objects depicted in the selected 2D image; and
   displaying in the virtual environment, via a graphical user interface, the generated 3D models at the corresponding determined placement locations.

2. The computer-implemented method of claim 1, wherein the processor is further configured to algorithmically determine an arrangement of 3D models that correspond to the one or more objects based on at least in part on stored physical attributes of the corresponding objects and specified parameters of the virtual environment.

3. The computer-implemented method of claim 1, wherein the processor is further configured to algorithmically determine an arrangement of 3D models that correspond to the one or more objects based on at least in part on the depicted layout of objects from the 2D image and specified parameters of the virtual environment to facilitate automated arrangement of the 3D models in the virtual environment.

4. The computer-implemented method of claim 1, wherein the processor is further configured to algorithmically determine an arrangement of 3D models that correspond to the one or more objects based on at least in part on the depicted layout of the one or more objects in the selected 2D image and specified parameters of the virtual environment to facilitate an automated initial arrangement of the 3D models in the virtual environment, without further input by the user after user selection of the 2D image of the set of 2D images.

5. The computer-implemented method of claim 1, further comprising:

storing in a product information database product information, for products corresponding to the objects depicted in the set of 2D images, the product information including a product identifier to relate the object to a known purchasable object, information to associate an object in a 2D image with a product in a product information database and purchase information indicating where the product is available for purchase.

6. The computer-implemented method of claim 1, wherein the set of 2D images include a visual representations of rooms depicted in an image, including objects in the room, layouts of the objects including the location of the objects within the room and relative location of the objects with respect to one another, further comprising storing, in an image database image metadata information in association with the selected 2D image, the image metadata information including information identifying the objects in the image and layout information of the objects in the image.

7. The computer-implemented method of claim 6, wherein the image metadata information comprises attribute information about the image, including a category type of the room or other space depicted in the image and décor style information.

8. The computer-implemented method of claim 6, wherein the image metadata information comprises information for identifying an object in a 2D image and metadata about the images and/or objects including physical attributes of the room in the 2D image and physical attributes of the objects.

9. The computer-implemented method of claim 1, wherein the placement rules comprise computer-readable instructions to place the 3D models according to stored physical attributes of the corresponding objects and specified parameters of the virtual environment.

10. The computer-implemented method of claim 1, wherein the processor is further configured to apply rendering rules based stored object information, including rules for rendering a 3D model of an object with respect to that of another object.

11. The computer-implemented method of claim 1, wherein the processor is further configured to execute a preprocessing module to process the set of 2D images to create and store image information, identify objects, physical attributes of the objects and a layout of the objects in the selected 2D image, map identified objects to stored 3D model data, and store the mapping in one or more storage devices.

12. The computer-implemented method of claim 1, wherein the processor is further configured to display one or more graphical user interfaces configured to display in a first user interface portion one or more 2D images and user interface tools to enable the user to search and/or scroll through the set of 2D images and select at least one of the set of 2D images and to automatically display in a second user interface portion the virtual environment and objects from the selected 2D image.

13. The computer-implemented method of claim 1, wherein the method further comprises algorithmically determining the placement of rendered 3D models of objects in the virtual environment by identifying usable spaces in the virtual environment, selecting a starting object, identifying a mounting point for placing a 3D model of the starting object, determining remaining space and selecting a second object and identifying a location for placement of a 3D model of the second object, wherein the placement of the 3D models corresponding to the starting object and second object is determined in accordance with a stored set of placement rules.

14. The computer-implemented method of claim 1, the steps further comprising:

storing metadata in association with a stored 2D image, where the metadata comprises physical attributes of the objects in the stored 2D image; and wherein the placement locations are based at least in part on the physical attributes of the objects.

15. The computer-implemented method of claim 1, further comprising the steps of:

displaying, via a graphical user interface, objects identified from one or more 2D images;

in response to receiving user selection of one or more objects from the one or more 2D images;

identifying the 3D model data for the one or more selected objects; and displaying in the virtual environment, via a graphical user interface, a 3D model of the selected objects.

* * * * *

UNITED STATES PATENT AND TRADEMARK OFFICE
CERTIFICATE OF CORRECTION

| | | |
|---|---|---|
| PATENT NO. | : 11,875,280 B2 | Page 1 of 1 |
| APPLICATION NO. | : 18/063365 | |
| DATED | : January 16, 2024 | |
| INVENTOR(S) | : Barry Besecker et al. | |

It is certified that error appears in the above-identified patent and that said Letters Patent is hereby corrected as shown below:

In the Claims

Column 36, Line 57, (Claim 3, Line 5), change "the depicted layout" to --the layout--;

Column 36, Line 65, (Claim 4, Line 5), change "the depicted layout" to --the layout--.

Signed and Sealed this
Twenty-sixth Day of March, 2024

*Katherine Kelly Vidal*

Katherine Kelly Vidal
*Director of the United States Patent and Trademark Office*